US007488034B2

(12) United States Patent
Ohren et al.

(10) Patent No.: US 7,488,034 B2
(45) Date of Patent: Feb. 10, 2009

(54) ANTI-REBOUND BAR FOR CHILD SAFETY SEAT

(75) Inventors: Hans Derek Ohren, Fort Mill, SC (US); Phillip Przybylo, Waxhaw, NC (US); Benjamin Shane Bustle, Charlotte, NC (US); Jerry Wayne Campbell, Rock Hill, SC (US); W. Jake Kozlowski, Jr., Tega Cay, SC (US); Dieter Maier, Giengen a.d. Brenz (DE); Adrian Batchelor, Berkshire (GB); Paul Brindley, Wiltshire (GB); Troy Mason, Brownsburg, IN (US); Andrew Mendenhall, Mooresville, IN (US); Paul Zink, Indianapolis, IN (US); Jason Andrews, Indianapolis, IN (US); Dennis Turner, Mooresville, IN (US)

(73) Assignee: Britax Child Safety, Inc., Charlotte, NC (US)

( * ) Notice: Subject to any disclaimer, the term of this patent is extended or adjusted under 35 U.S.C. 154(b) by 0 days.

(21) Appl. No.: 11/749,418

(22) Filed: May 16, 2007

(65) Prior Publication Data

US 2008/0067846 A1 Mar. 20, 2008

Related U.S. Application Data

(63) Continuation of application No. 11/677,662, filed on Feb. 22, 2007.

(60) Provisional application No. 60/777,423, filed on Feb. 28, 2006.

(51) Int. Cl.
*B60N 2/42* (2006.01)
*A47D 1/00* (2006.01)
*A47C 31/00* (2006.01)

(52) U.S. Cl. .................. 297/216.11; 297/256.16; 297/256.15; 297/253; 297/183.6

(58) Field of Classification Search ............ 297/216.11, 297/256.15, 256.16, 250.1, 253, 183.6, 183.3
See application file for complete search history.

(56) References Cited

U.S. PATENT DOCUMENTS

| 4,640,545 | A | * | 2/1987 | von Wimmersperg | .. 297/216.11 |
| 5,468,014 | A | * | 11/1995 | Gimbel et al. | ............. 280/735 |
| 5,722,720 | A | * | 3/1998 | Lumley | ................. 297/216.11 |
| 5,947,556 | A | * | 9/1999 | Strojny | .................. 297/256.16 |
| 5,971,479 | A | * | 10/1999 | Jacquemot et al. | ..... 297/256.14 |
| 6,669,288 | B2 | * | 12/2003 | Nakagawa et al. | ..... 297/256.16 |
| 6,715,828 | B1 | * | 4/2004 | Cheng | ..................... 297/183.3 |
| 6,796,610 | B2 | * | 9/2004 | Nakagawa et al. | ..... 297/256.16 |
| 2005/0253431 | A1 | * | 11/2005 | Hei et al. | .................. 297/250.1 |
| 2005/0264062 | A1 | * | 12/2005 | Longenecker et al. | .... 297/250.1 |
| 2008/0012408 | A1 | * | 1/2008 | Jane Santamaria | ..... 297/256.16 |

FOREIGN PATENT DOCUMENTS

WO        WO8500563        *  2/1985

* cited by examiner

*Primary Examiner*—Milton Nelson, Jr.
(74) *Attorney, Agent, or Firm*—Adams Intellectual Property Law, P.A.

(57) ABSTRACT

A child safety seat assembly, including a base for being positioned on a vehicle seat bottom. An anti-rebound bar is carried by the base and extends outwardly and upwardly from a foot end of the base for engaging a seat back of the vehicle seat to which the seat is attached for retarding inertia-induced rotation of the base and the attached carrier by transmitting rotational force applied to the seat during a sudden change in velocity into the seat back of the vehicle seat onto which the seat is attached.

7 Claims, 44 Drawing Sheets

ANTI-REBOUND BAR FOR CHILD SAFETY SEAT

CROSS-REFERENCE TO RELATED APPLICATIONS

This application claims the benefit of Provisional Application No. 60/777,423, filed on Feb. 28, 2006 and U.S. application Ser. No. 11/677,662 filed on Feb. 22, 2007.

TECHNICAL FIELD AND BACKGROUND OF INVENTION

This invention relates to child safety seats, particularly those of the type principally intended to provide safe seating conditions for infants and small children while riding in vehicles. More particularly, this application discloses an anti-rebound bar for retarding inertia-induced rotation of the base and the attached carrier by transmitting rotational force applied to the seat during a sudden change in velocity into the seat back of the vehicle seat onto which the seat is attached. This type of seating product is regulated by governmental authorities in order to provide a safe environment during vehicle operation. Many such seats also provide features that permit the seat to be easily removed from and installed in the vehicle, provide the ability for the seat to be carried or attached to other conveyances, such as strollers. As governmental regulations have changed, seats have been designed to provide, for example, secure latching points to the vehicle seat, rear-facing attachment to the vehicle seat, separation and removal of a carrier portion from a base portion, and adjustment of the carrier to accommodate the size of the child's growth during the period of seat use that comply with these regulations. Seats heretofore developed have incorporated some such features piecemeal, and thus present countervailing disadvantages, such as unnecessary weight and bulk, difficulty in removing the carrier/base combination from, and attaching the carrier/base combination to, the vehicle seat, or the carrier from the base, and adjusting the carrier and/or base to accommodate the child's growth.

The present application discloses a child safety seat that has been designed to be relatively light weight, compact, easy to use, versatile and adaptable to a wide range of vehicle seating types and features, while achieving a high standard of comfort and safety. Within the basic design, provision has been made for the addition or removal of features to achieve compliance with varying governmental regulations. In particular, the seat can be provided with fixed Isofix latches, tethered Isofix latches or seatbelt locks.

The seat and its components as disclosed in the application also have a novel and aesthetically pleasing appearance.

SUMMARY OF THE INVENTION

Therefore, it is an object of the invention to provide a child safety seat.

It is another object of the invention to provide a child safety seat that is lightweight and compact.

It is another object of the invention to provide a child safety seat that has a wide range of adjustment and adaptability.

It is another object of the invention to provide a child safety seat that permits modification as required to comply with different governmental regulations.

It is another object of the invention to provide a child safety seat that is easily installed in and removed from a vehicle seat.

It is another object of the invention to provide a child safety seat that includes a carrier that is easily detached from a base.

It is another object of the invention to provide a child safety seat that includes an anti-rebound bar carried by the base of the seat.

It is another object of the invention to provide a child safety seat that includes an anti-rebound bar that provided enhanced safety by restricting the extent to which the seat, when rear facing, can be displaced from its position on the vehicle seat.

These and other objects and advantages of the invention are achieved by providing a child safety seat, comprising a carrier having a seat bottom and a seat back, a base for receiving the carrier and for permitting the carrier and base to be secured to each other and as a unit to a vehicle seat; and an anti-rebound bar carried by the base and extending outwardly and upwardly from a foot end of the base for engaging a seat back of the vehicle seat to which the seat is attached for retarding inertia-induced rotation of the base and the attached carrier by transmitting rotational force applied to the seat during a sudden change in velocity into the seat back of the vehicle seat onto which the seat is attached.

According to one embodiment of the invention, the anti-rebound bar is attached to opposite sides of the base proximate a bottom surface thereof.

According to another embodiment of the invention, the anti-rebound bar is attached to opposite sides of the base proximate a bottom surface thereof and extends outwardly and upwardly to an apex that is in a plane above an uppermost extent of the base.

According to another embodiment of the invention, the anti-rebound bar is attached to opposite sides of the base proximate a bottom surface thereof and extends outwardly and upwardly to form a continuous side-to-side curved structure.

According to another embodiment of the invention, the anti-rebound bar is attached to opposite sides of the base proximate a bottom surface thereof and extends outwardly and upwardly to form a curve extending along a longitudinal axis of the base.

According to another embodiment of the invention, the anti-rebound bar is attached to opposite sides of the base proximate a bottom surface thereof and extends outwardly and upwardly to form a compound curve having a continuous side-to-side curve component and a front-to-rear curved component extending along a longitudinal axis of the base.

According to another embodiment of the invention, the anti-rebound bar is attached to opposite sides of the base forward of and attached to respective latching mechanisms whereby the carrier is attached to the base.

According to another embodiment of the invention, a child safety seat is provided, comprising a carrier having a molded plastic seat bottom and a seat back, a molded plastic base for releasably receiving the carrier, and a U-shaped carry handle attached to opposing lateral sides of the carrier and adapted for securing the carrier and base to each other, and lifting and carrying the carrier, and further including a one-hand carry handle release. First and second carry handle Isofix latches are carried by respective first and second opposing ends of the handle and adapted to latch complementary first and second Isofix latch bars carried by the base. First and second connector cables extend from each of the Isofix latches along an interior void in the handle to a handle grip positioned on the carry handle intermediate the first and second opposing ends of the handle. A release assembly, including an actuator button, is mounted in the carry handle proximate the handle grip and cooperates with the connector cables for simultaneously releasing both first and second Isofix latches from the complementary first and second Isofix latch bars in the base upon operation of the actuator button of the release assembly to thereby detach the carrier from the base. An anti-rebound bar is carried by the base and extends outwardly and upwardly from a foot end of the base for engaging a seat back of the vehicle seat to which the seat is attached for retarding inertia-induced rotation of the base and the attached carrier by transmitting rotational force applied to the seat during a sudden change in velocity into the seat back of the vehicle seat onto which the seat is attached.

BRIEF DESCRIPTION OF THE DRAWINGS

The description of the invention will proceed with reference to the following drawings.

DESCRIPTION OF THE PREFERRED EMBODIMENT AND BEST MODE

Figure 1:
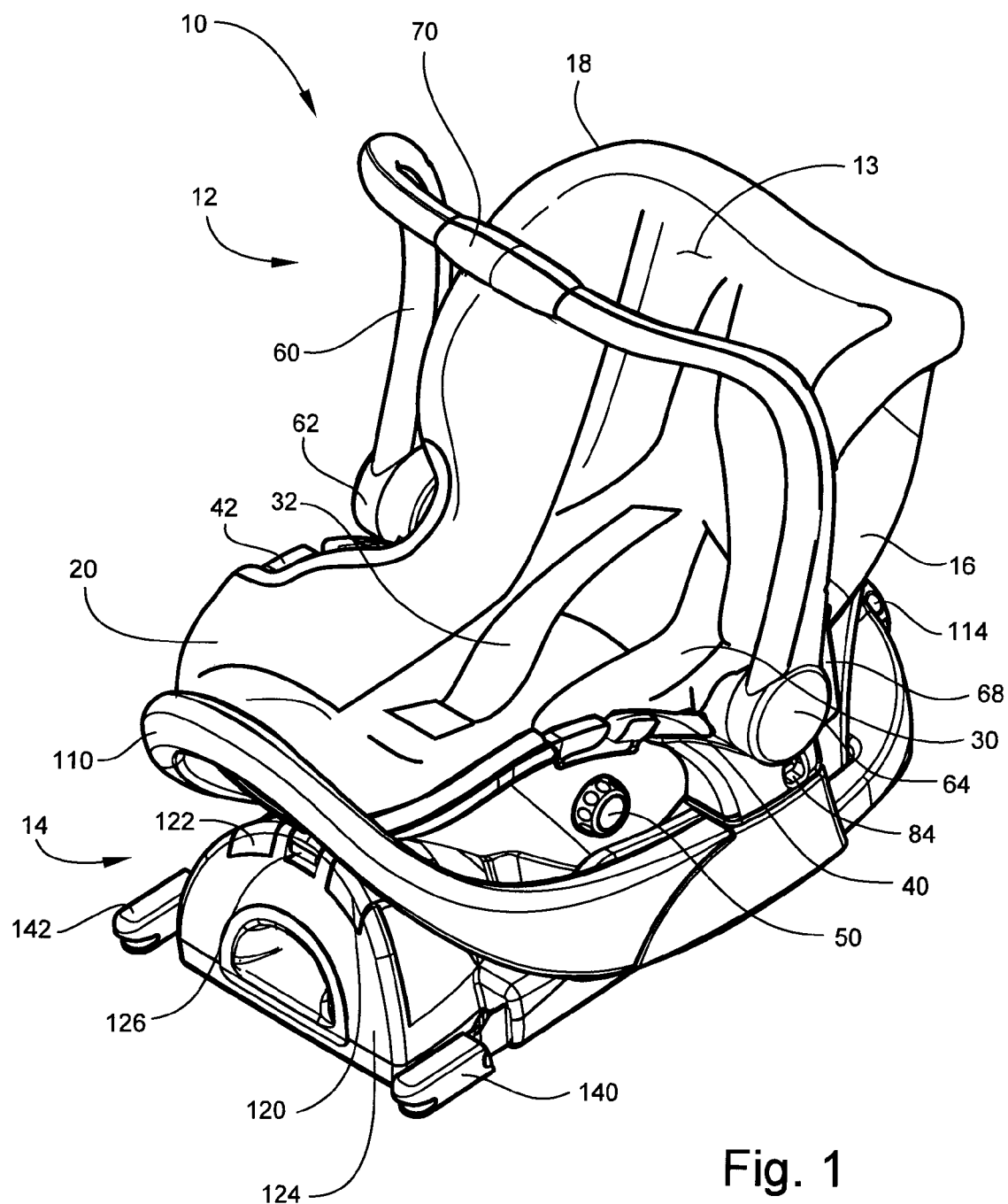
FIG. 1 is an overall perspective view of the child safety seat including the padding and dress cover.

Referring now to FIG. 1 of the drawings, where like reference numerals indicate like or equivalent elements, a child safety seat according to one preferred embodiment of the invention is shown at broad reference numeral 10. The child safety seat 10 includes an infant carrier 12 that is releasably attached to a seat base 14, as described and explained below. The carrier 12, as shown, includes padding and a dress cover 13 that is omitted from the remaining drawings for purposes of clarity, and to aid description of the underlying features of the carrier 12.

Figure 2:
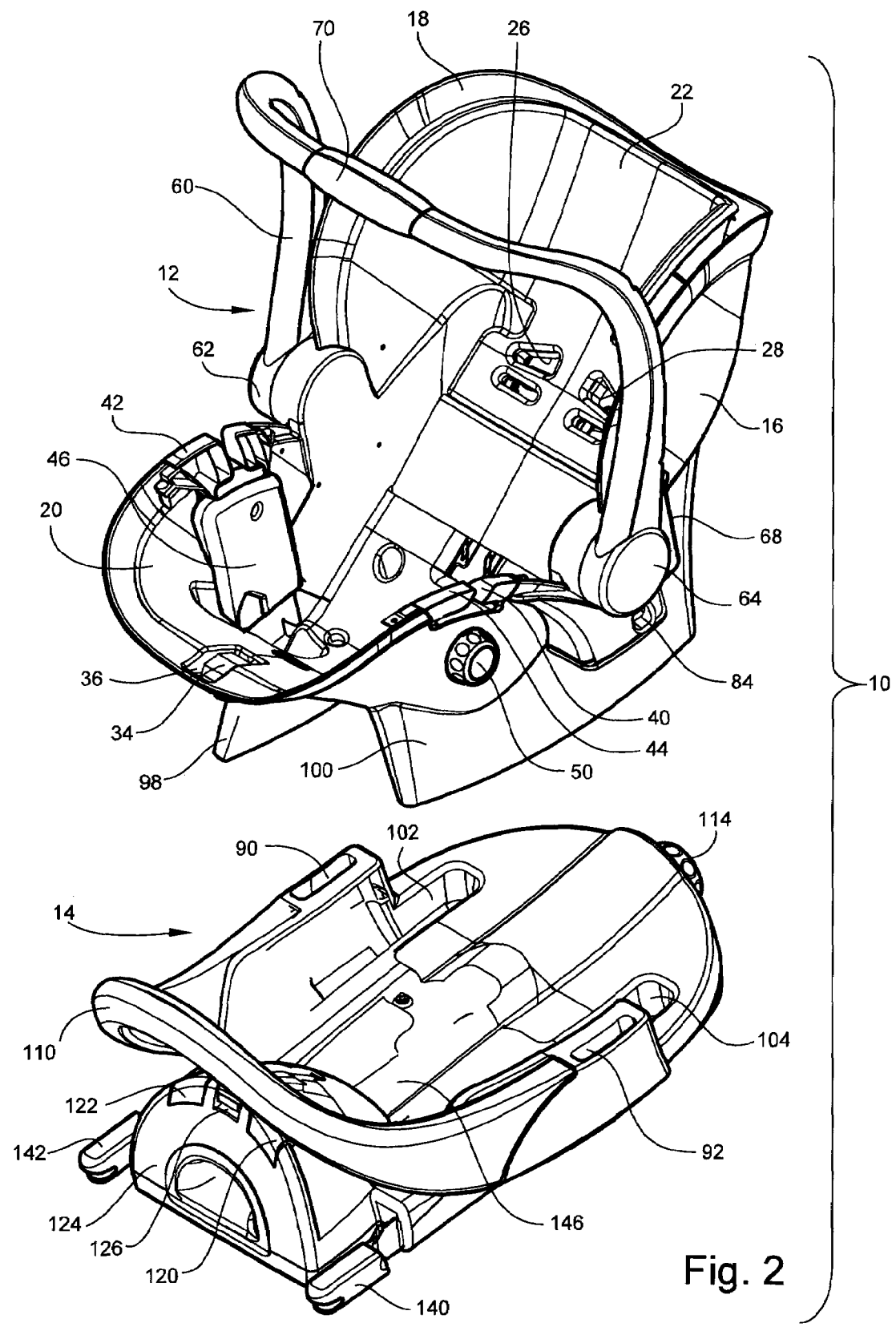
FIG. 2 is a separated view of the carrier portion and the base portion of the child safety seat, with the padding and dress cover removed for clarity.
Figure 3:
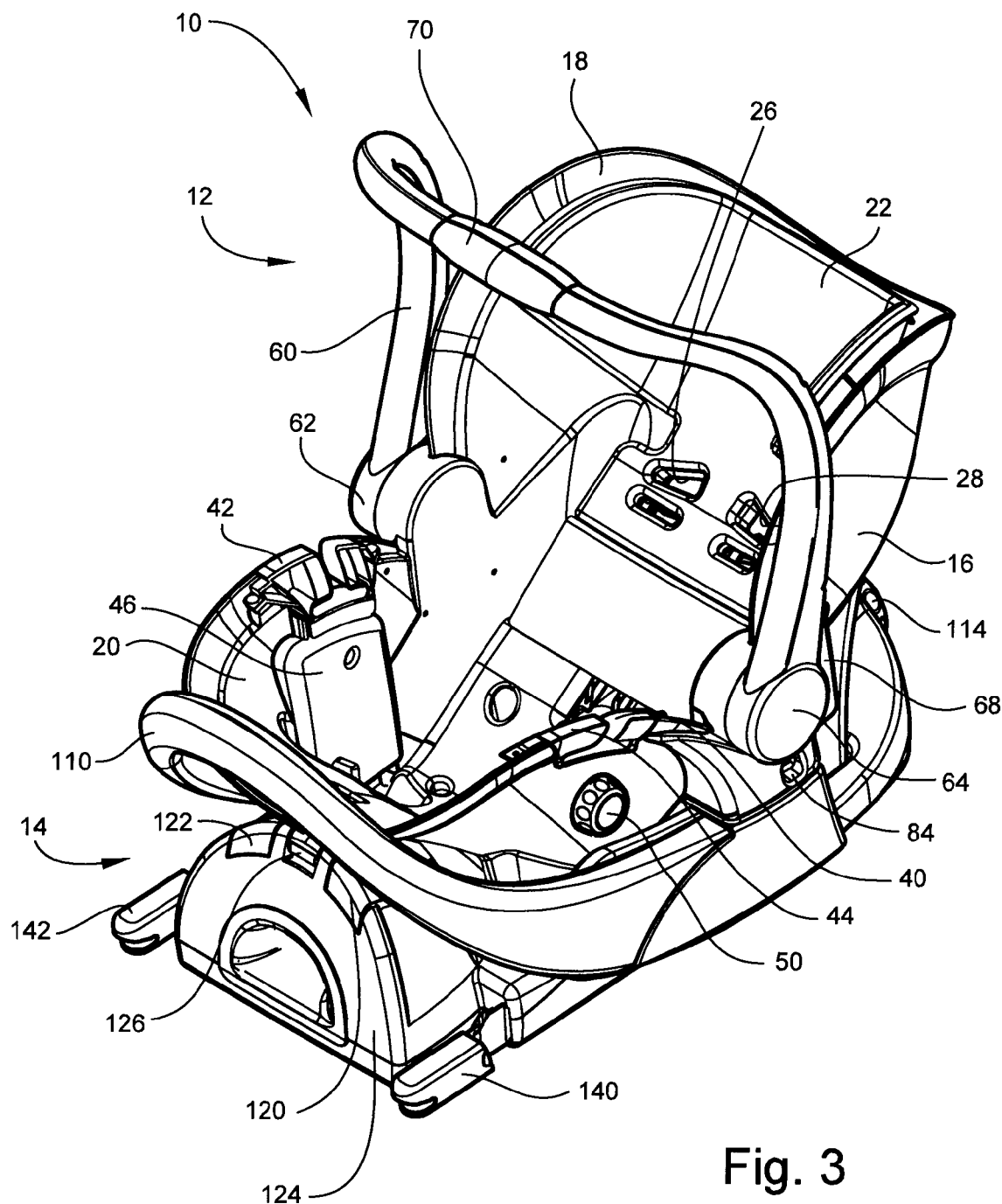
FIG. 3 is an overall perspective view of the child safety seat.
Figure 7:
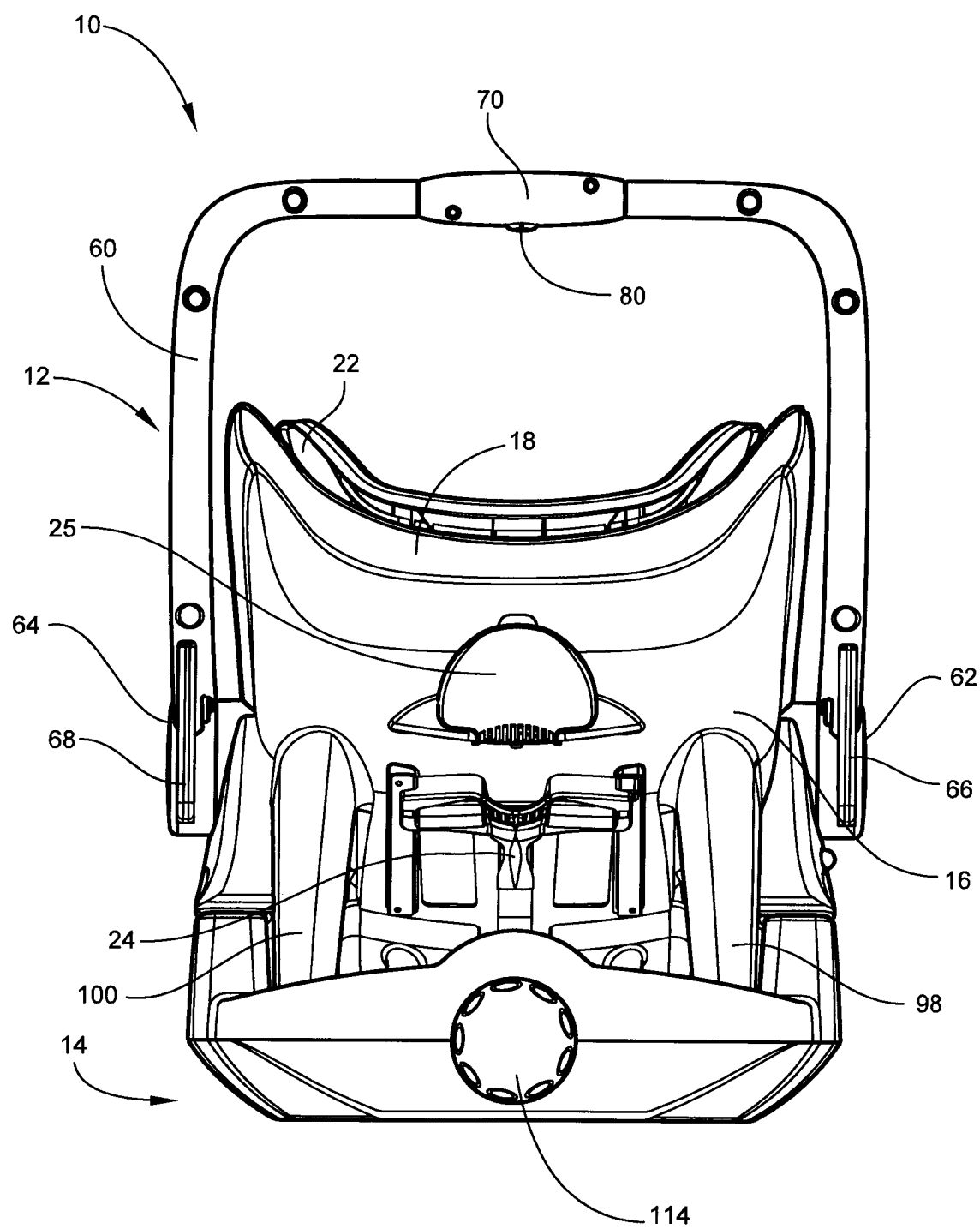
FIG. 7 is a rear elevation of the child safety seat.
Figure 8:
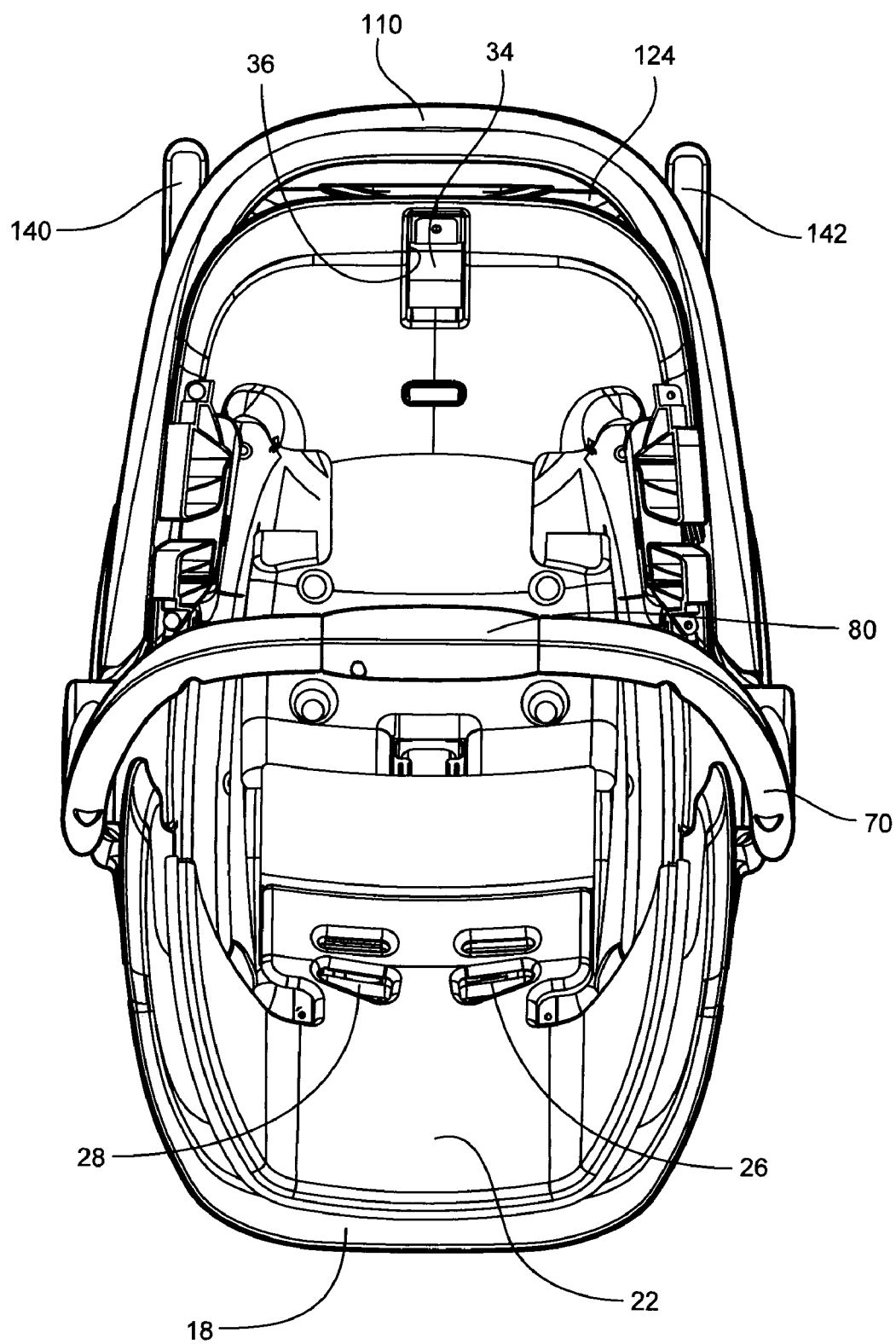
FIG. 8 is a top plan view of the child safety seat.
Figure 9:
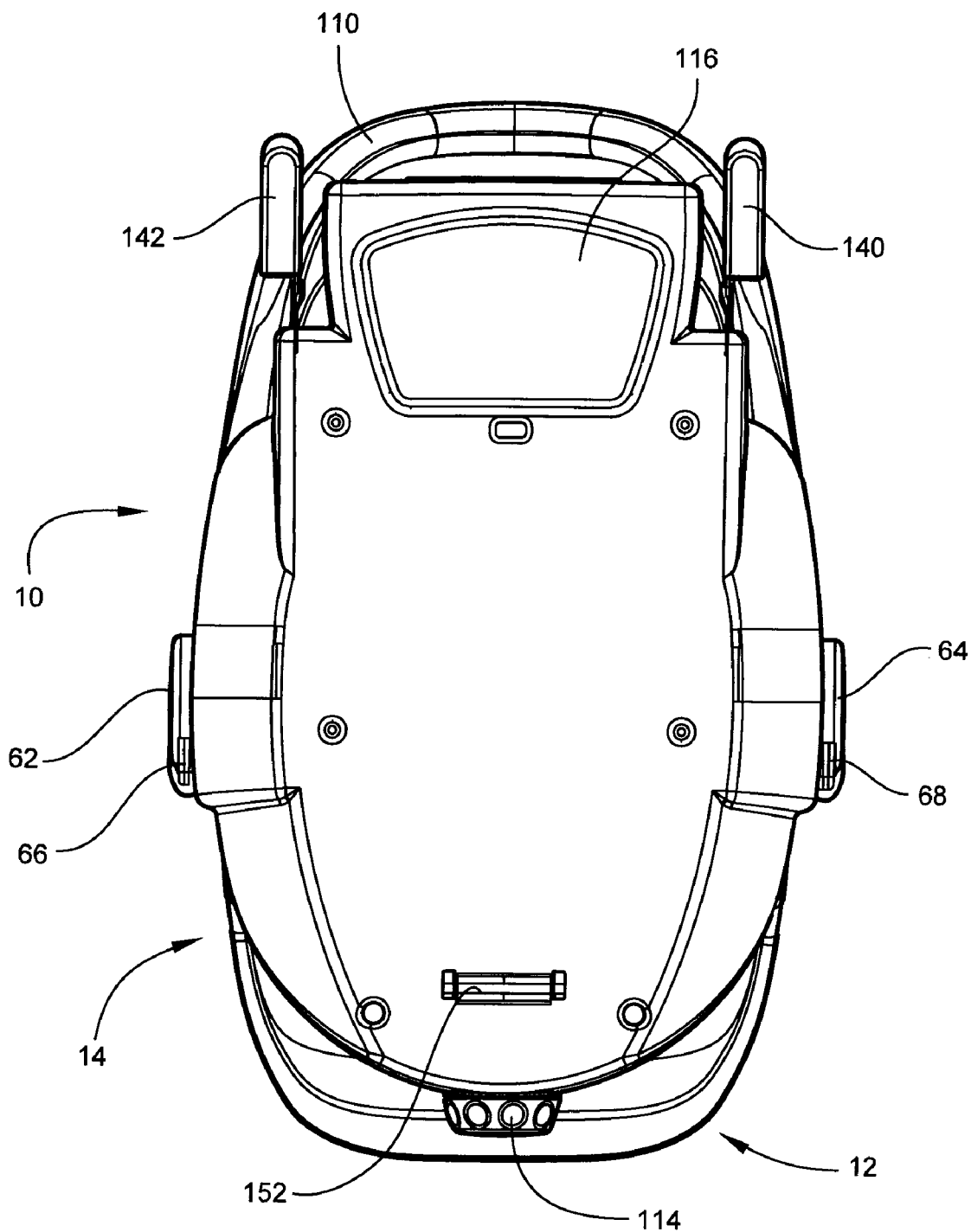
FIG. 9 is a bottom plan view of the child safety seat.

Referring now to FIG. 2, the carrier 12 is molded of high-impact plastic according to conventional plastic molding techniques and includes a shell 16 with an upper back rest and head rest portion 18, and a torso and leg rest portion 20. A head rest insert 22 is positioned in the head rest portion 18 and is preferably molded of a semirigid impact-absorbing material such as expanded polystyrene (EPS). The interior side-to-side distance of a preferred embodiment of the headrest insert 22 is approximately 310 mm. The headrest insert 22 is adapted for adjustment between a lowered position shown in FIG. 2 and a raised position, not shown. As is best shown in FIG. 7, the head rest insert 22 is adjusted by means of an adjustment mechanism 24 that permits a controlled sliding of the headrest insert 22 along the surface of the headrest portion 18 of the shell 16. The back of the shell 16 also includes a belt guide 25.

Shoulder harness slots 26, 28 accommodate a pair of shoulder straps 30, 32, shown in FIG. 1, that extend through the back of the shell 16 and pass over the shoulders of the seat occupant. The shoulder straps 30, 32 gain access to the exterior of the carrier 12 through slots in the padding and dress cover 13. Referring to the remaining drawings, the shoulder straps 30, 32 are tightened by a latch 34, known as an "A-lock adjustor", positioned in an opening 36 in the leg rest portion 20 of the shell 16 that captures and retains a single latch strap that extends past the latch 34 and is tightened by pulling the strap through the latch 34. The latch strap is released by depressing the latch 34 to release an engagement with the strap to permit it to be withdrawn from the latch 34 by pulling on the shoulder straps 30, 32.

The carrier 12 includes a pair of belt path inserts 40, 42 positioned on opposite sides of the carrier 12 that permit a vehicle seat belt to be extended laterally over the carrier 12, correctly positioned relative to the carrier 12 and retained in that position. A pair of side adjust inserts 44, 46 are positioned in the leg rest portion 20 of the carrier 12. The inserts 44, 46 include respective adjustment knobs 48, 50 that are positioned on respective threaded adjustment studs, not shown, and reside on the exterior surface of the carrier 12. By turning the knobs 48, 50, the effective width of the leg rest portion 20 can be adjusted inwardly or outwardly for maximum comfort and safety of the seat occupant.

Figure 14:
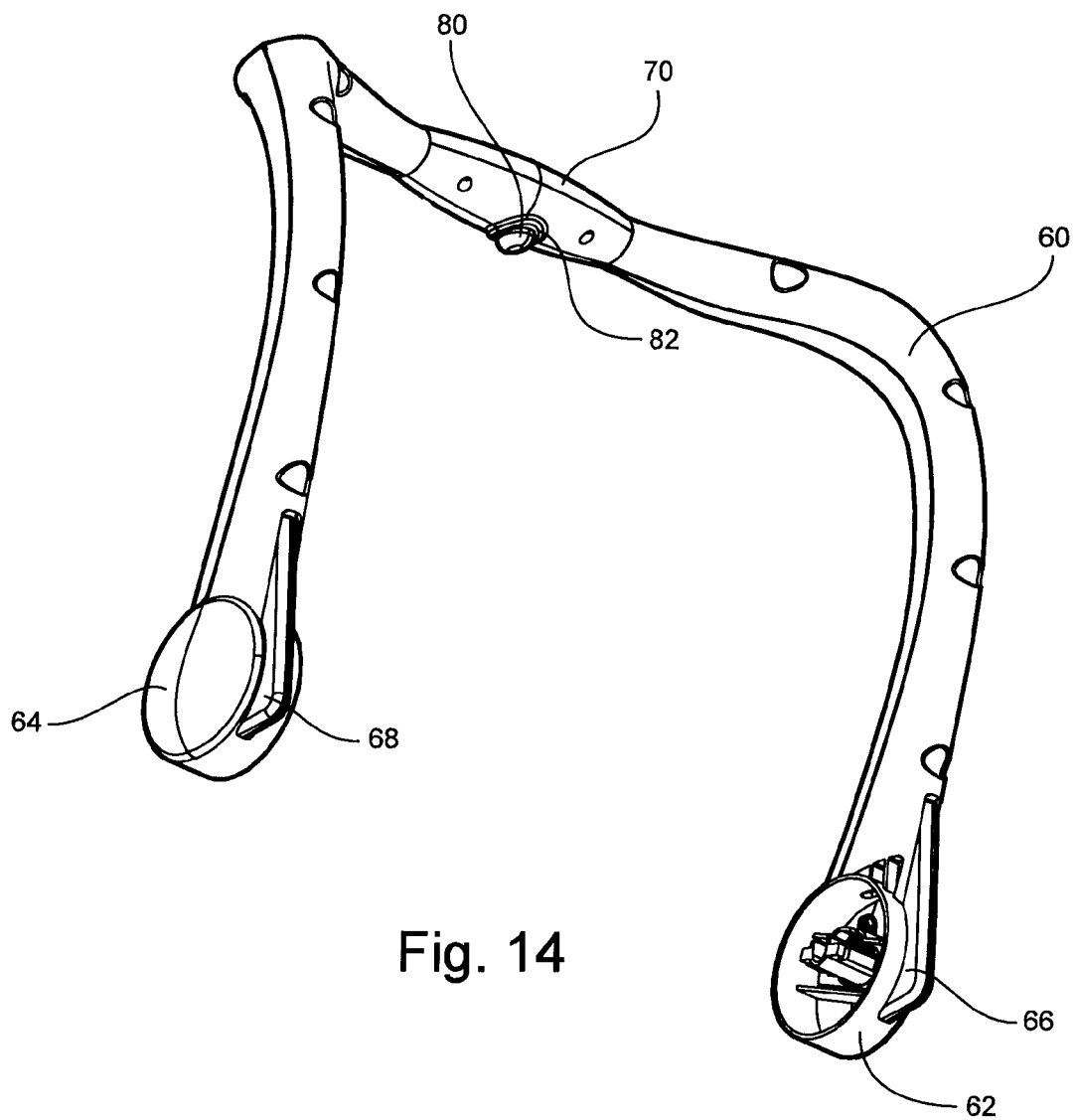
FIG. 14 is a perspective view of the carrier handle.
Figure 15:
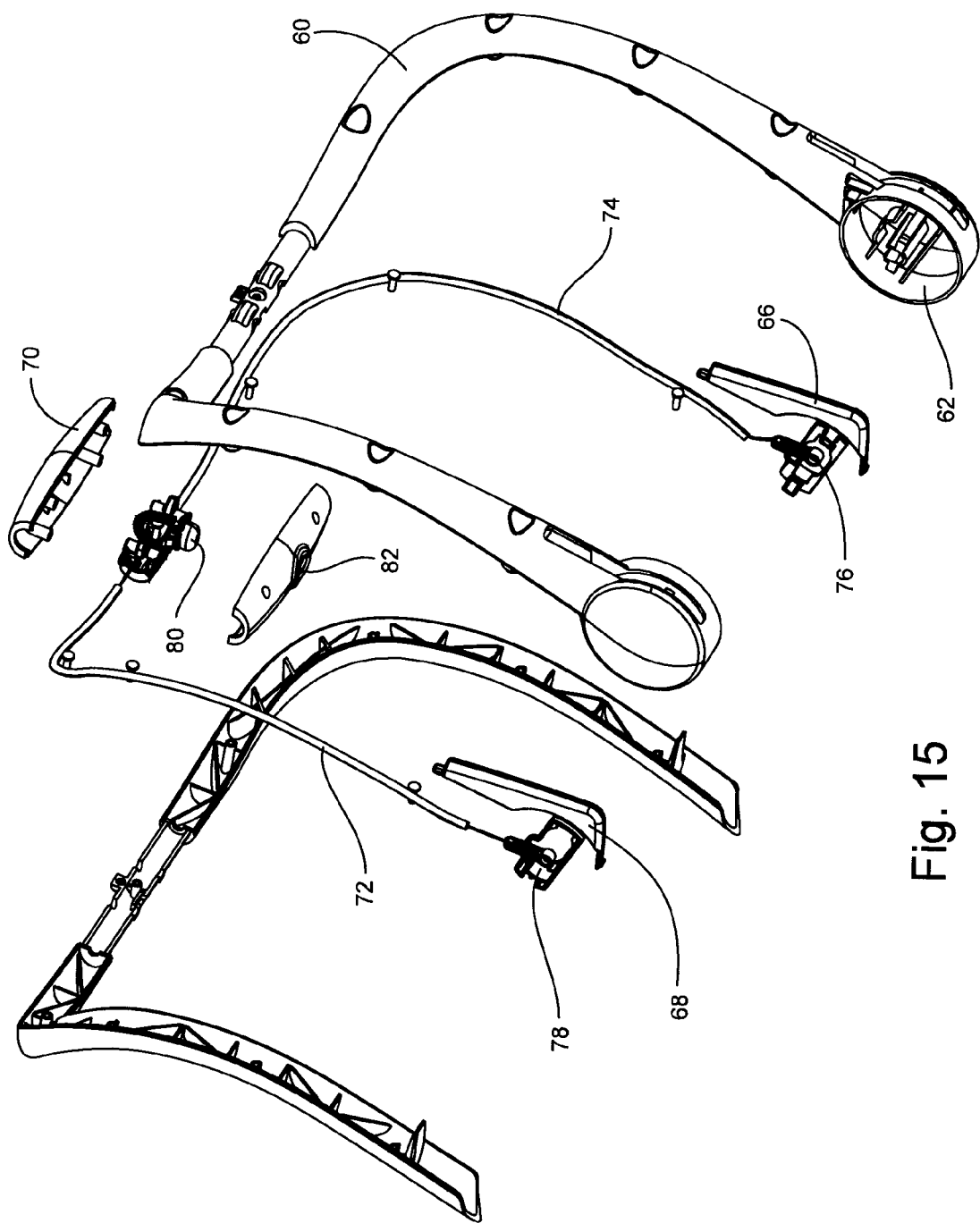
FIG. 15 is an exploded view of the carrier handle shown in FIG. 14.

The carrier 12 is lifted and carried by means of a carry handle 60 mounted to the carrier 12 by hubs 62, 64. As is best shown in FIGS. 2, 14 and 15, rotation of the handle 60 to the desired position is achieved by releasing a pair of handle position locks 66, 68. Simultaneously depressing both of the position locks 66, 68 radially inwardly towards the respective hubs 62, 64 releases engagement between the position locks 66, 68 and respective mating locking mechanisms in the hubs 62, 64 and allows the handle 60 to be rotated as desired. Releasing the locks 66, 68 locks the handle 60 into the desired position.

The handle 60 also operates as the means of unlocking the carrier 12 from the base 14. As best shown in FIGS. 1, 2, 14,15, 17 and 19, the handle 60 includes a centrally positioned handle release 70 that also functions as a handle grip. The handle release 70, when rotated around the longitudinal axis of the handle 60, operates a pair of cables 72, 74 connected to a pair of lock attachments 76, 78. The lock attachments 76, 78 are secured to a pair of downwardly extending "Isofix"-type latches 79. The cables 72, 74 operate to open the latches 79 when the handle release 70 is rotated. A secondary release button 80, positioned in an opening 82 in the handle release 70 normally prevents rotation of the handle release 70. The button 80 must be depressed and held in the depressed position in order for the handle release 70 to be rotated. When the handle release 70 is rotated, the Isofix latches 79 are opened and the carrier 12 may be lifted off of the base 14.

This feature substantially reduces the possibility that the handle release 70 will inadvertently rotate and release the carrier 12 from the base 14 during an impact or sudden change in vehicle speed or acceleration. It is not necessary to rotate the handle release 70 when locking the carrier 12 to the base 13.

Figure 4:
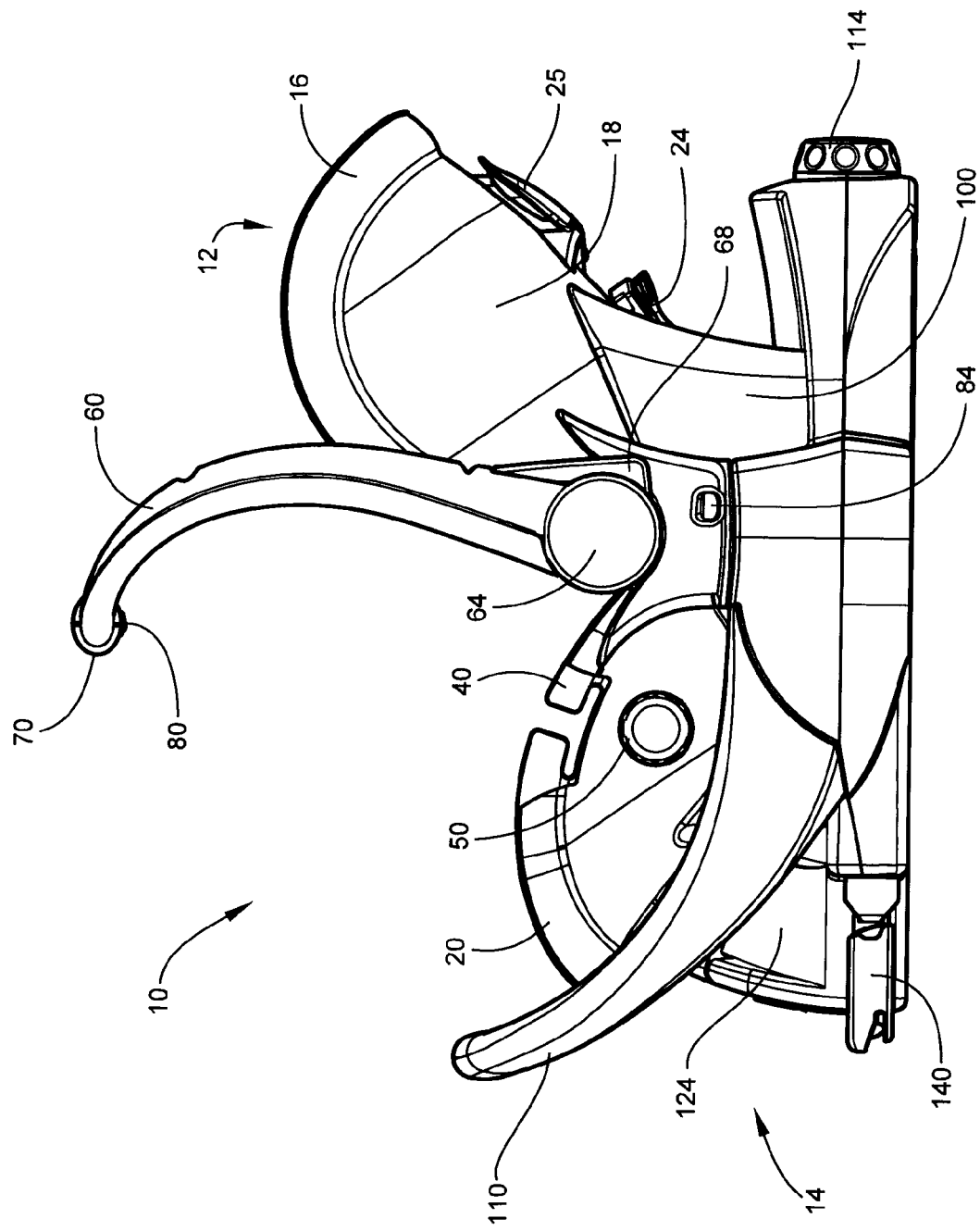
FIG. 4 is a left side elevation of the child safety seat.
Figure 5:
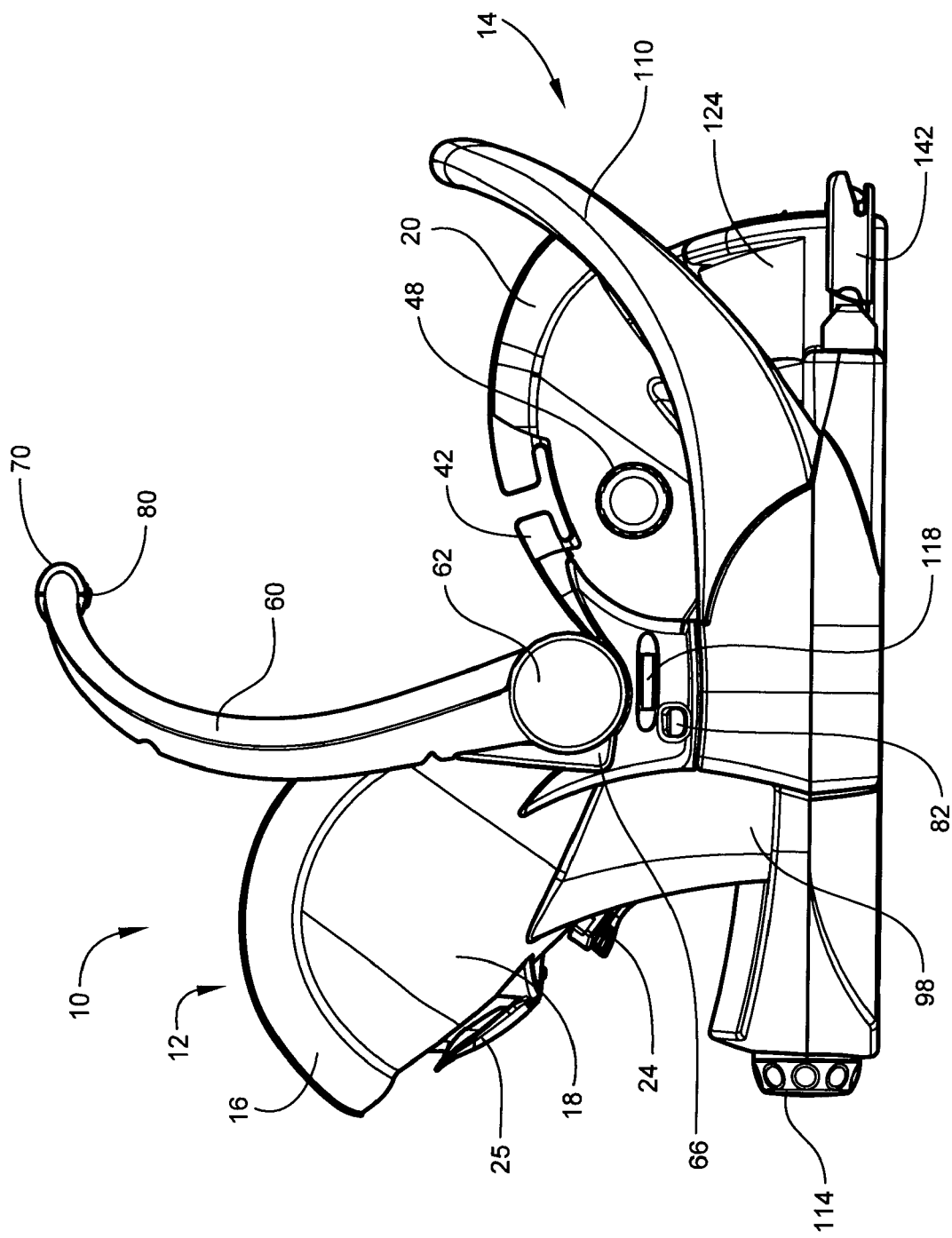
FIG. 5 is a right side elevation of the child safety seat.

Lock indicator windows 82 (FIG. 4), and 84 (FIG. 5) permit a visual confirmation that the carrier 12 has been properly locked onto the base 14.

Figure 11:
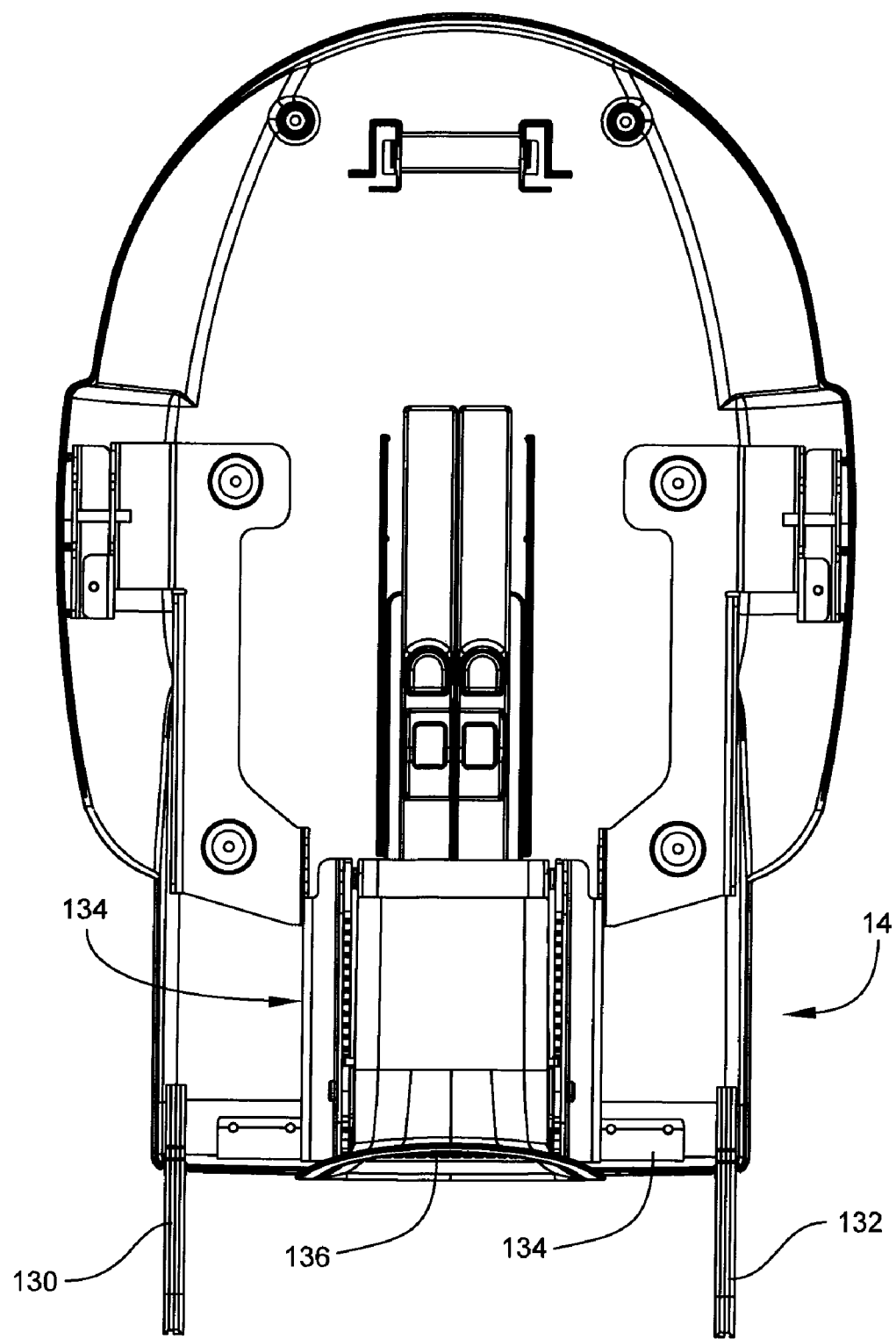
FIG. 11 is a top plan view of the base, with the top cover removed for clarity.
Figure 12:
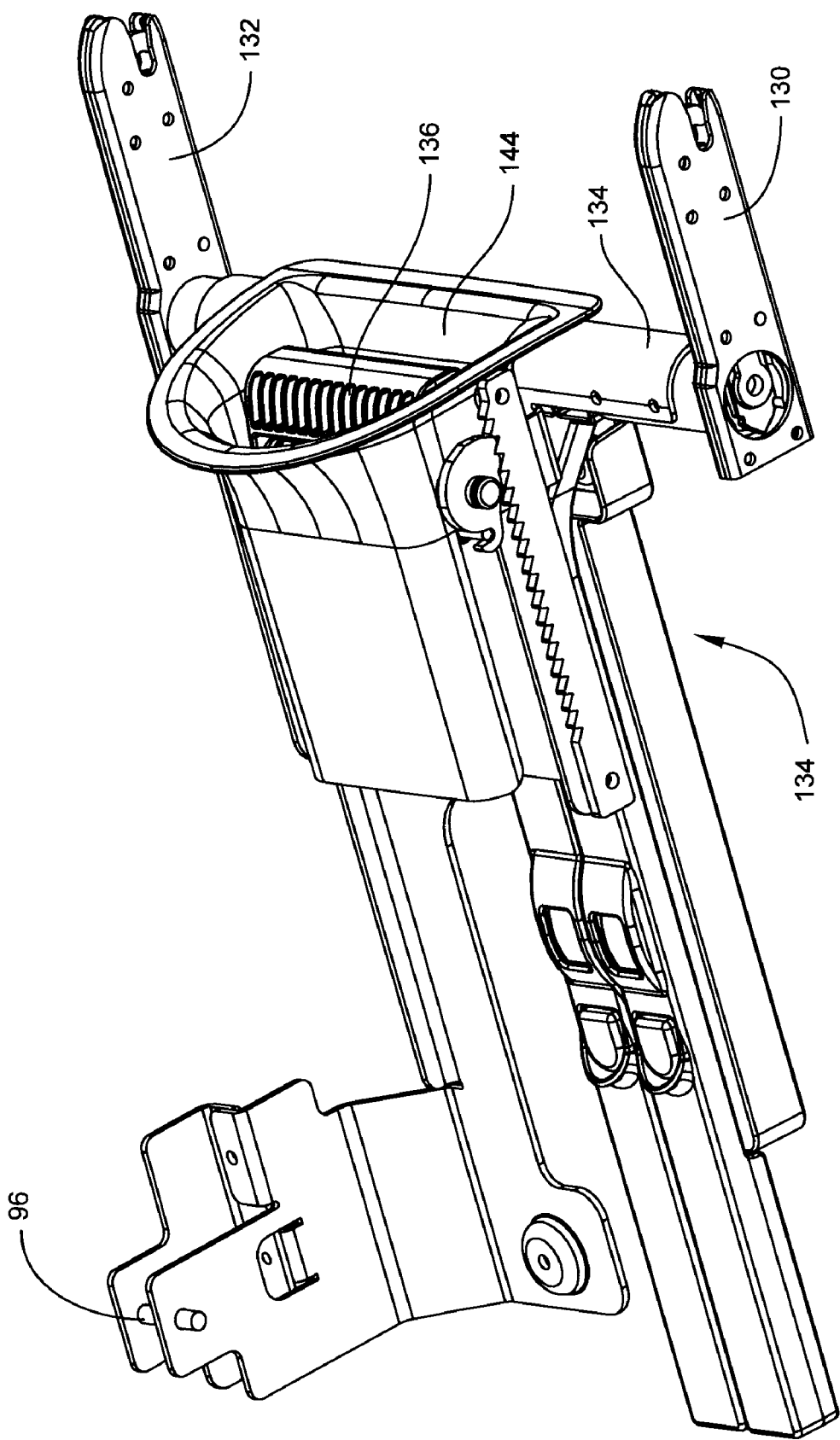
FIG. 12 is a perspective view of the latching mechanism of the base to the vehicle seat and the base to the carrier.

Referring now to FIGS. 2, 11 and 12, the Isofix latches of the carrier 12 fit into respective slots 90, 92 in the base 14. The slots 90, 92 contain respective locking bars 94, 96 that capture the Isofix latches, and lock the carrier 12 and base 14 into a single unitary structure. The carrier 12 and base 14 are further stabilized and maintained in fixed position with relation to each other by means of a pair of relatively large, elongate feet 98, 100 that fit into mating elongate recesses 102, 104 formed in the head end of the base 14.

Figure 6:
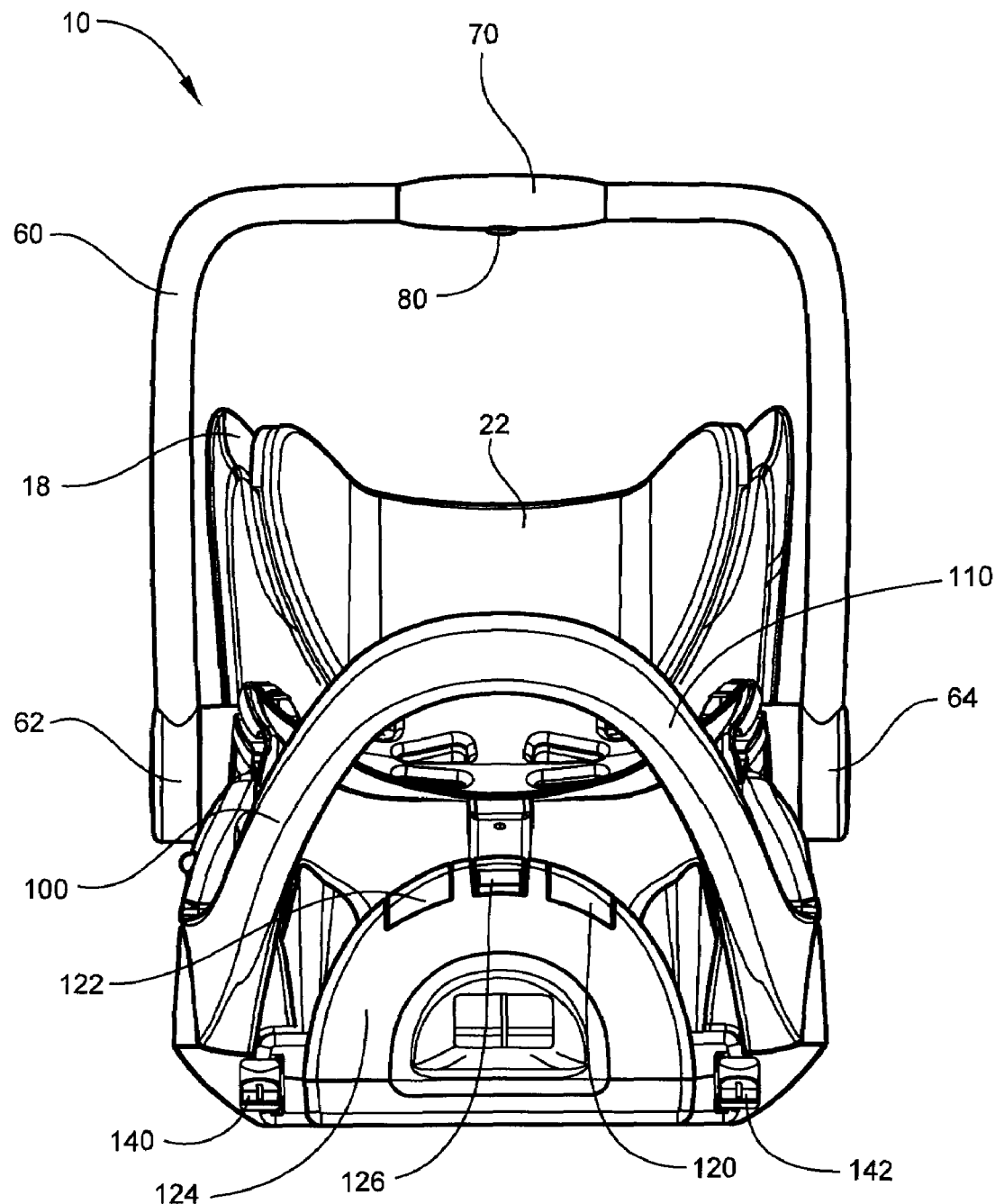
FIG. 6 is a front elevation of the child safety seat.
Figure 13:
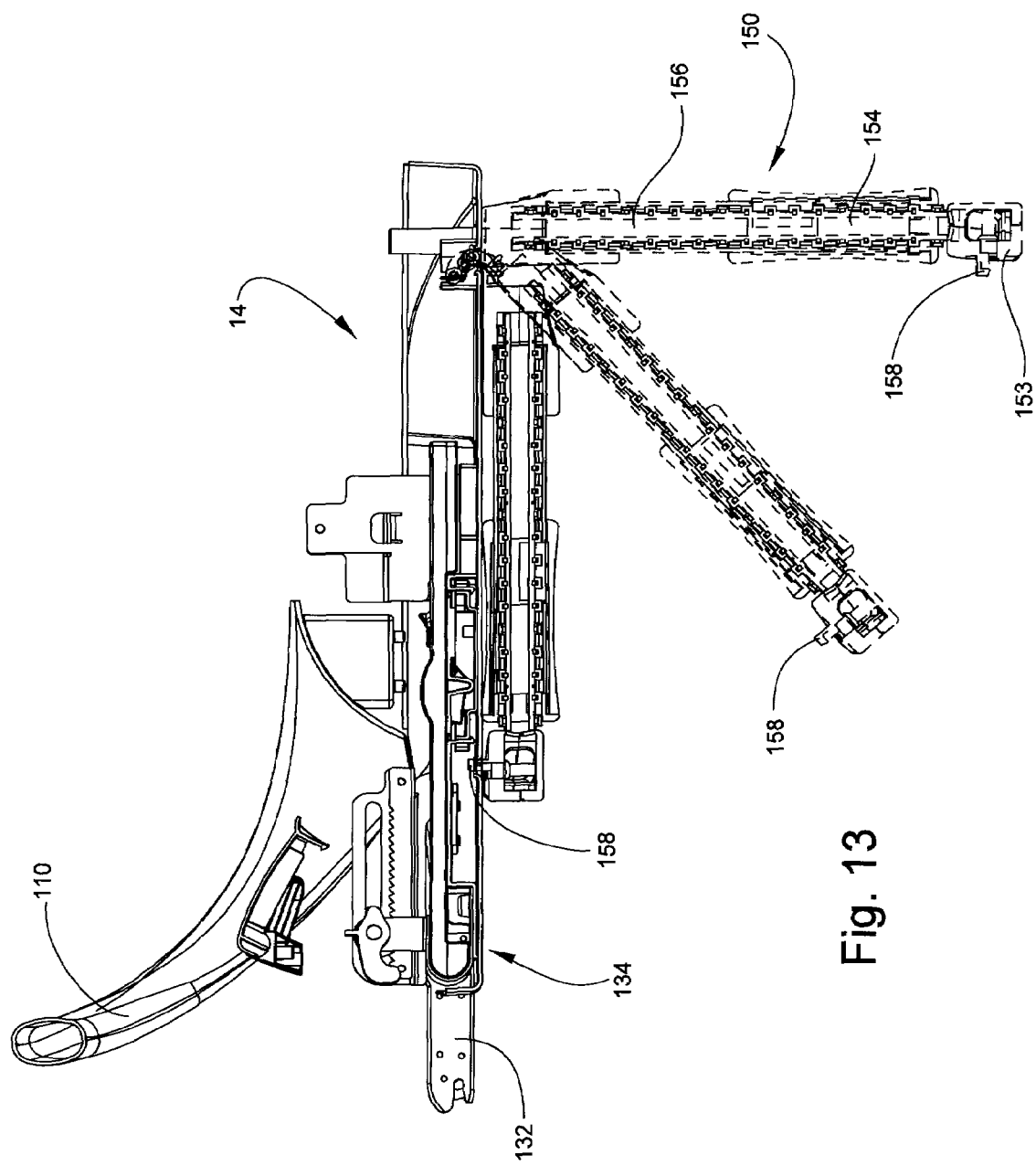
FIG. 13 is a fragmentary side elevation of the base according to a modified embodiment with a leg prop.

Referring now to FIGS. 2, 6 and 13, the base 14 includes a curved anti-rebound bar 110 that projects outwardly and upwardly from the foot end of the base 14 and engages the seat back of the vehicle seat to which the seat 10 is attached. In the event of an impact or sudden change in velocity of the vehicle in which the seat 10 is carried, the anti-rebound bar 110 retards inertia-induced rotation of the base 14 and the attached carrier 12 by transmitting rotational force applied to the seat 10 into the seat back of the vehicle seat onto which the seat 10 is attached.

The base 14 is leveled on the vehicle seat bottom by a level adjustor knob 114. The knob 114, when turned, rotates a screw that extends a block along the longitudinal axis of the base 14. The block engages a slide that wedges against a recline block 116 positioned in the bottom surface of the base 14 and causes the base 14 to tilt. The carrier 12 mounted in the base 14 can thus be positioned at an appropriate level position. A level indicator 118 positioned on either the base 14 or the carrier 12 (FIG. 5) permits a visual indication and confirmation that the base 14 and carrier 12 are properly leveled. The level indicator 118 may be a "bubble" type level, a pendulum-type level, or any other suitable means of permitting adjustment of the seat 10 into a suitably level position on the vehicle seat, and may be positioned on either one or both sides of the carrier 12 or base 14.

Figure 16:
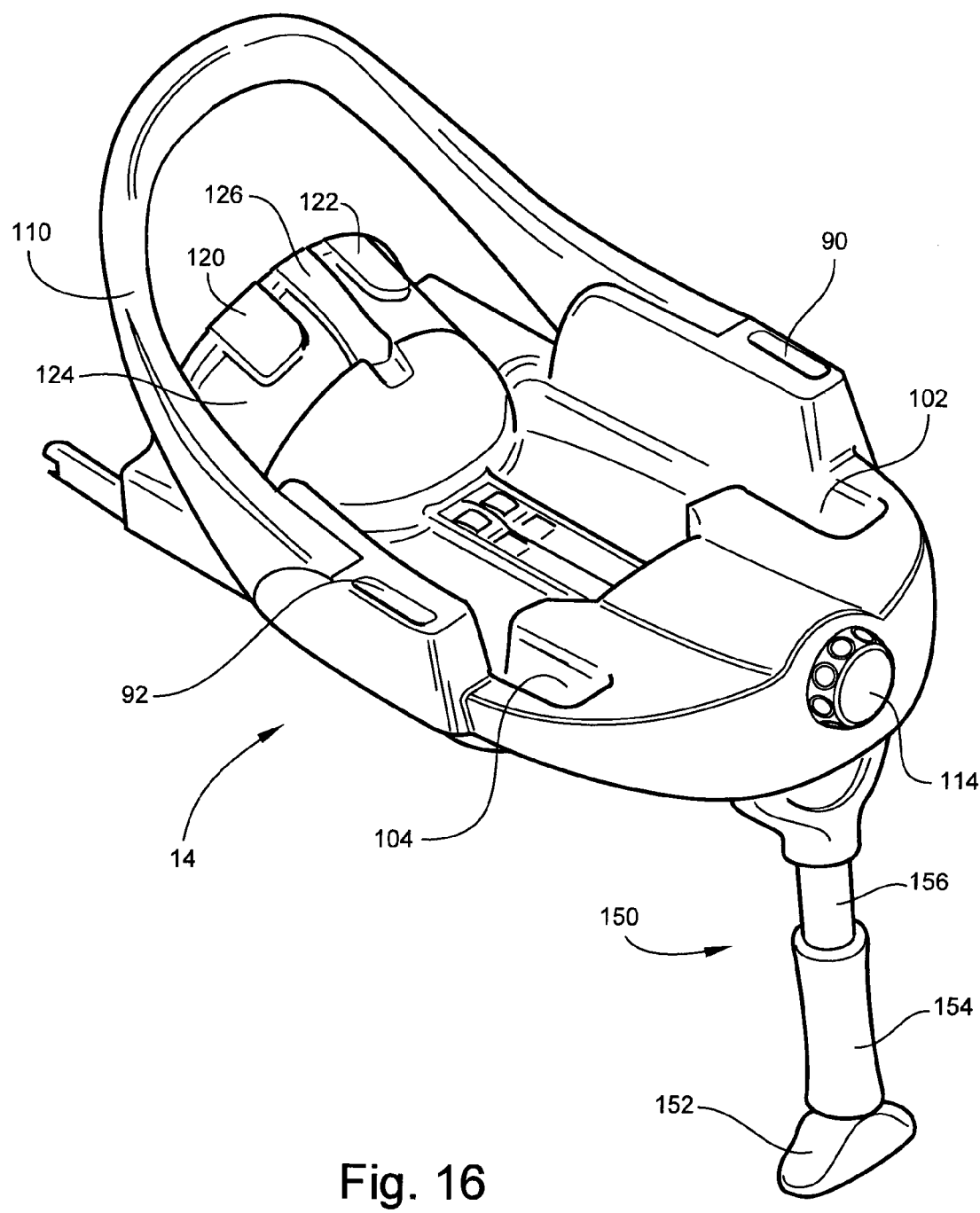
FIG. 16 is a perspective view of the base with the leg prop deployed.
Figure 17:
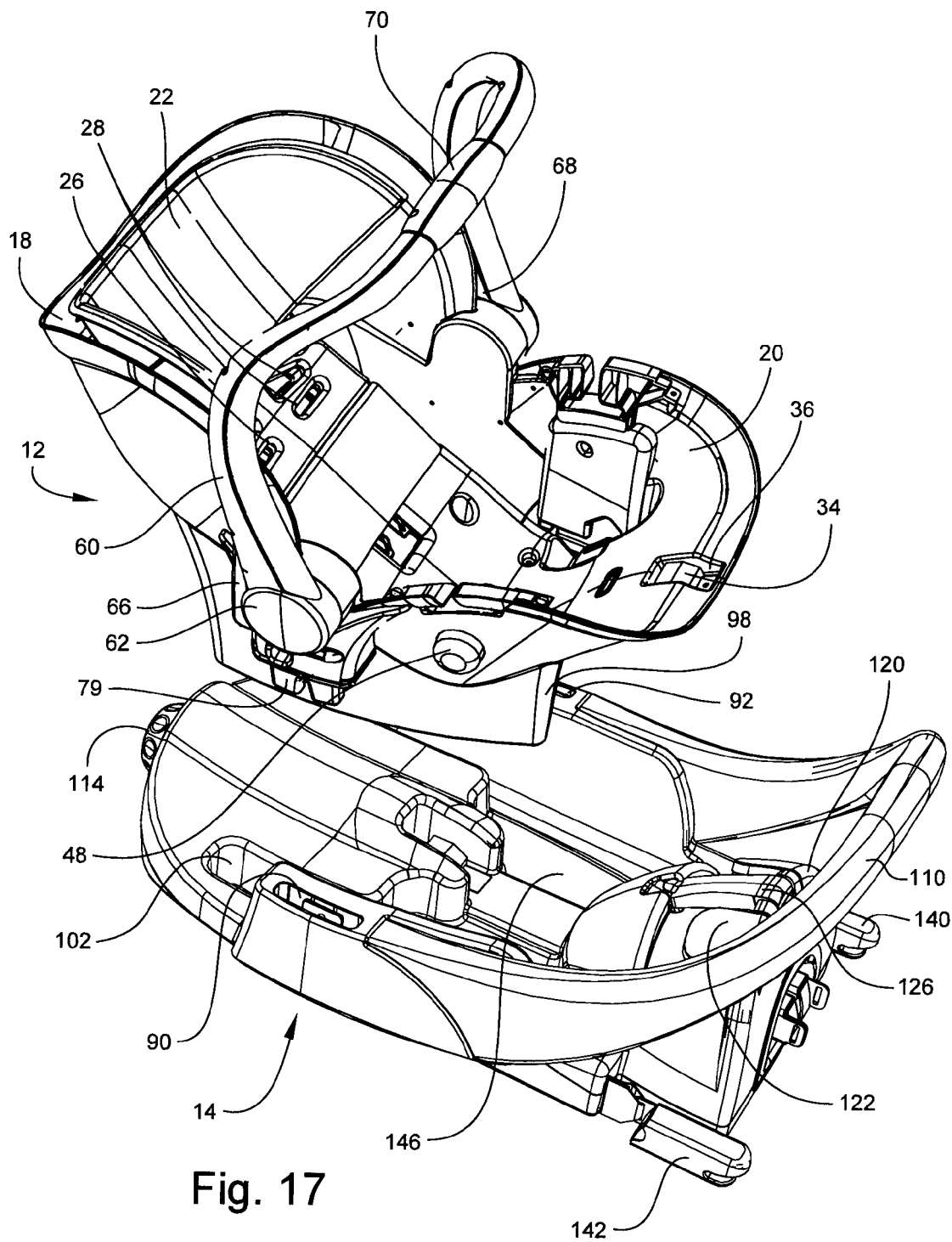
FIG. 17 is a further separated view of the carrier portion and the base portion of the child safety seat, with the padding and dress cover removed for clarity.
Figure 18:
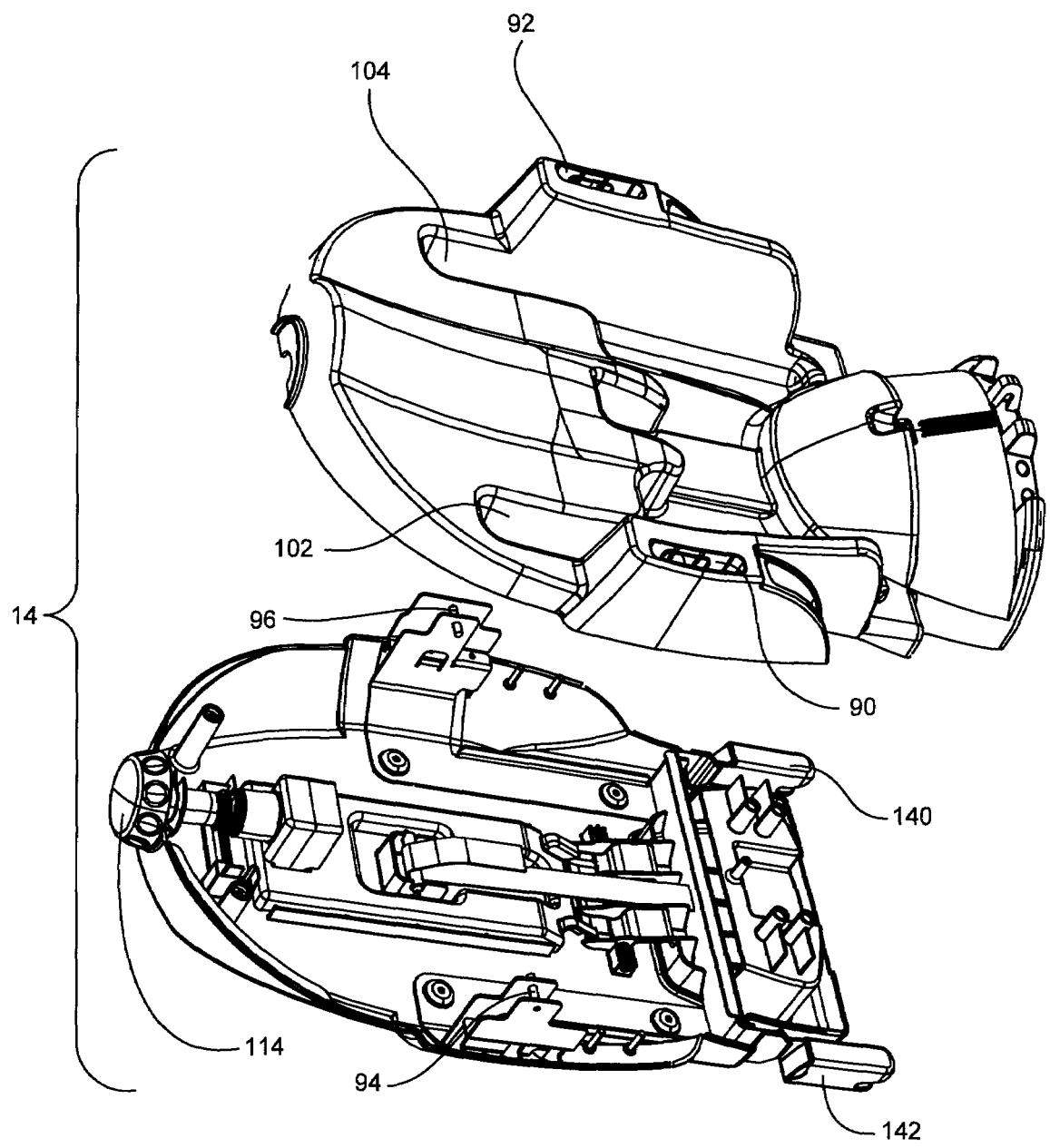
FIG. 18 is a partial exploded view showing details of the interior leveling and latch-tightening mechanisms of the base.
Figure 19:
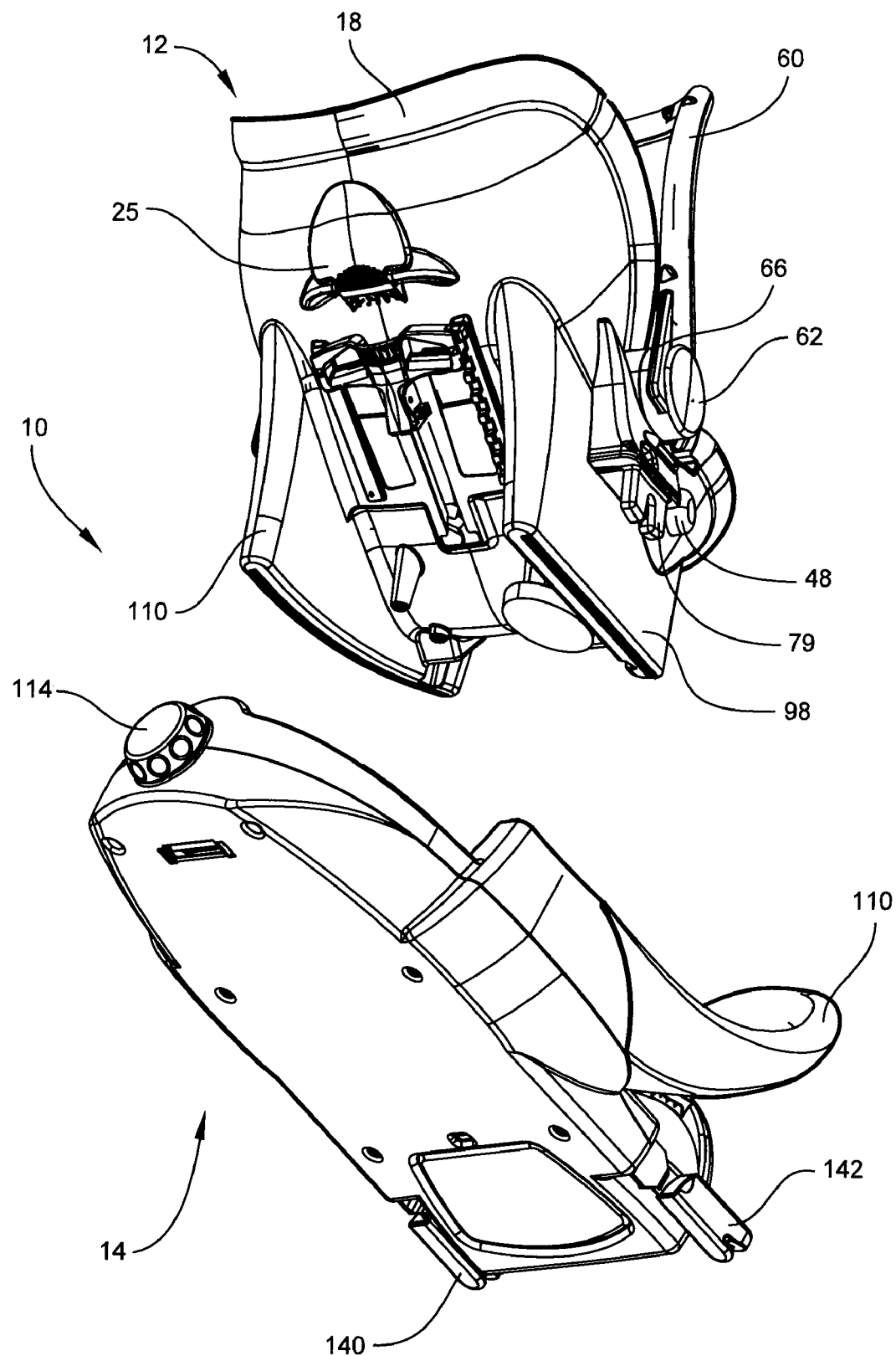
FIG. 19 is a further rear quarter, upwardly facing view of the child safety seat.
Figure 20:
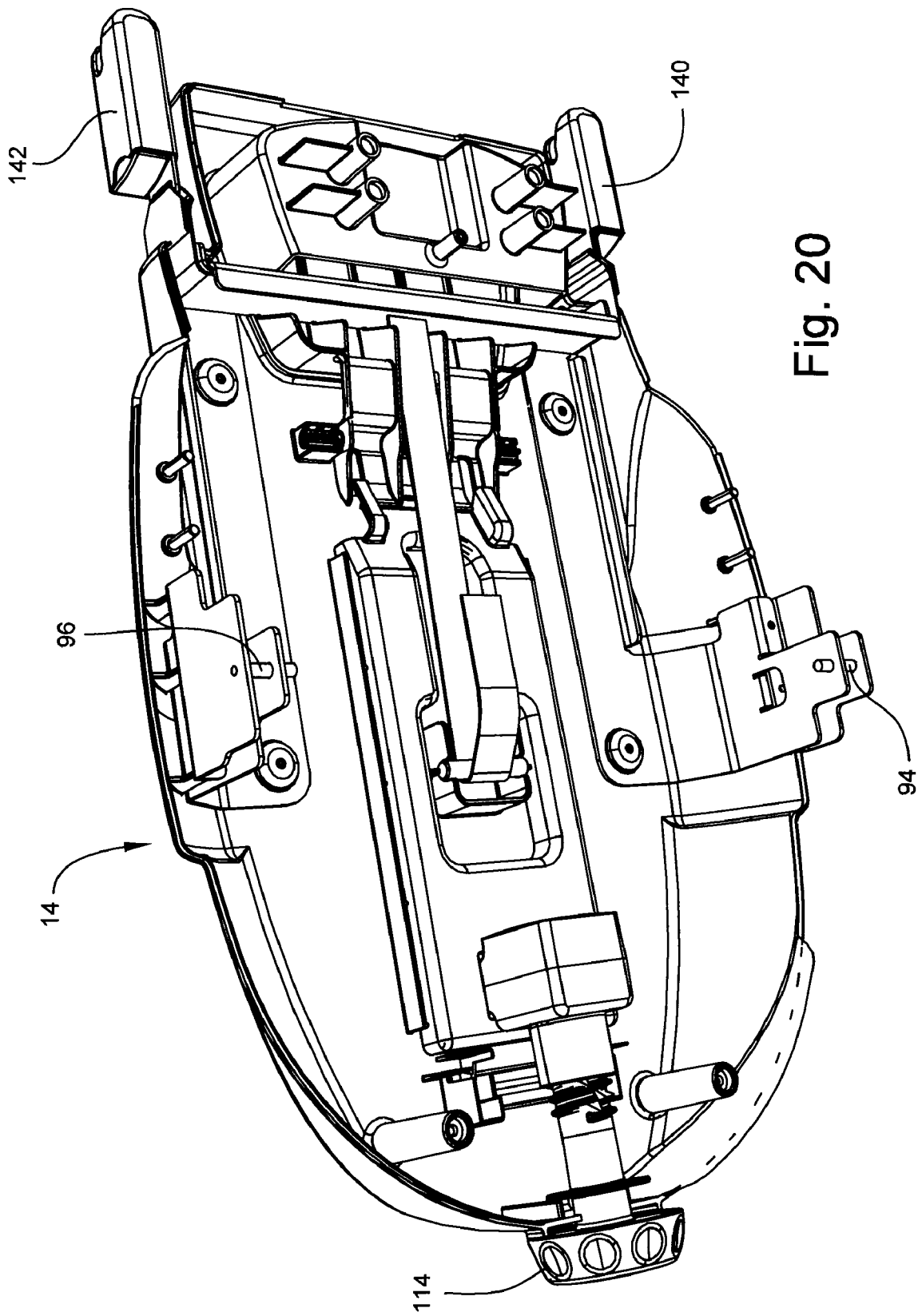
FIG. 20 is a view of the details of the base, showing the interior leveling and latch-tightening mechanisms.

Referring to FIG. 16, the base 14 may be secured to the vehicle seat by either use of the vehicle seat belt or "Isofix"-type latches. The base 14 includes a pair of spaced-apart belt hooks 120, 122 and a belt lock-off 126 mounted on the top of a housing 124 positioned on the foot end of the base 14. The belt hooks 120 and 122 are slightly spaced from the curved upper surface of the housing 124 and define spaces just sufficient to accommodate the thickness of the seat belt. The seat belt is extended laterally across the housing 124 under the belt hooks 120, 122 with the belt lock-off 126 in an open position. The belt lock-off 126, positioned between the two belt hooks 120, 122, is locked down over the seat belt, preventing it from moving in either an extension or retraction direction. The housing 124 also acts as a support for the foot end of the carrier 12.

Alternatively, the base 14 may be secured to the vehicle seat by means of Isofix latches 130, 132. As is best shown in FIGS. 11-13, the latches 130, 132 are fixed to the base 14 and mate to Isofix bars positioned behind the vehicle seat bottom that are now required on many vehicles. A ratchet mechanism 134 permits the extension and retraction of the Isofix latches 130, 132 as needed to secure the seat 10 to the vehicle seat. As is shown in FIG. 12, an adjuster 136 permits the extension position of the Isofix latches 130, 132 to be adjusted as needed to accommodate the vehicle seat to which the base is to be affixed. The housing 124 also provides storage for the tethered Isofix latches 130, 132.

In an alternative embodiment, FIGS. 2-5, the Isofix latches 140, 142 are affixed to tethers, not shown, that are joined to a single tether that is positioned in an Isofix lock-off 146 positioned at the mid-point of the base 14 between the front and rear ends. The Isofix latches 130, 132 may thus be extended to provide sufficient slack to allow them be latched onto the Isofix bars behind the vehicle seat, and then retracted by pulling on the single tether in the area of the Isofix lock-off 146. Pulling the tether draws the base 14 towards the vehicle seat, and, when suitably tight, the Isofix lock-off 146 is used to lock the tether into a fixed position and thus secure the base 14 in the desired position.

Figure 10:
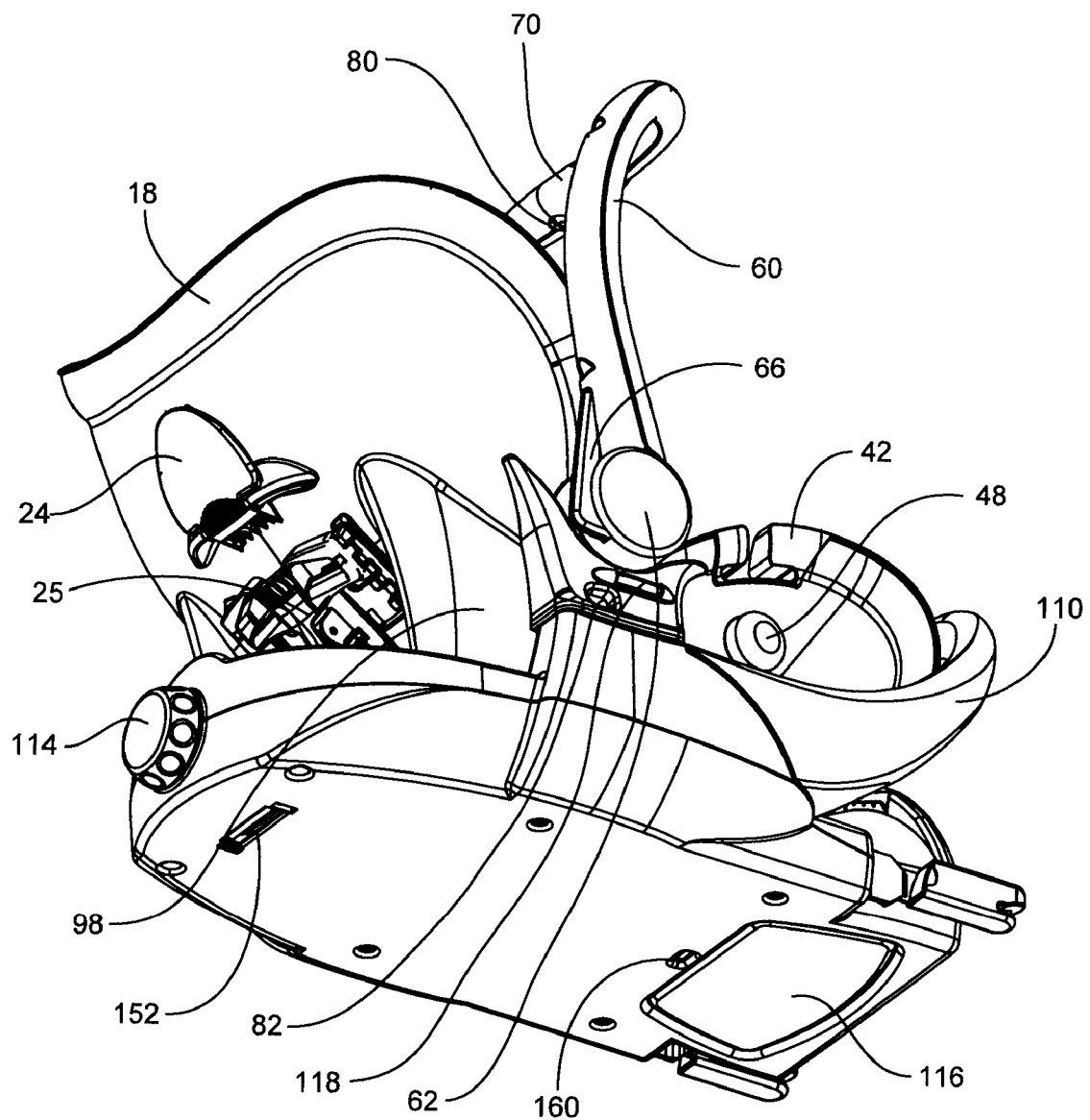
FIG. 10 is a rear quarter, upwardly facing view of the child safety seat.

As is best shown in FIGS. 13 and 16, the base 14 may optionally include a foot prop 150. The foot prop 150 is pivotally mounted to a mounting point 152 at the bottom of the base 14 and, when extended, as shown in FIG. 16 permits the head end of the seat 10 to be supported by engagement of an enlarged foot prop base 153 with the floor of the vehicle directly in front of the rear vehicle seat. The foot prop 150 is adjusted by extending or retracting a pair of telescoping tubes 154,156 to accommodate varying rear seat bottom heights. The foot prop 150 can be retracted and folded under the base 14. The foot prop 150 is retained in this position by a hook 158 that is received in a hole 160 in the bottom of the base 14, shown in FIG. 10.

The tubes 154 and 156 are retained in the desired telescoped position by spaced grooves formed in their surfaces. The grooves extend along only a portion of the axially-extending surfaces, and by rotating one of the tubes 154, 156 relative to the other, they can be slid into the desired position where they together form the appropriate length, and then rotated to interlock the grooves. This is preferable to tubes having openings that must be aligned and then locked in position with a locking pin or other locking device.

The foot prop 150 may alternatively have adjustable tubes that are tightened in position by a friction lock or other similar tightening device.

FIGS. 16-20 show further details of a preferred embodiment of the child safety seat according to this application.

Referring now to FIGS. 21-45, an alternative embodiment of the child safety seat is shown and described. In particular, as shown in FIGS. 21-28 a child safety seat according to one preferred embodiment of the invention is shown at broad reference numeral 200. The child safety seat 200 includes an infant carrier 202 that is releasably attached to a seat base 204, as described and explained below. The carrier 202, as shown, includes padding and a dress cover that is omitted from the drawings for purposes of clarity, and to aid description of the underlying features of the carrier 202.

The carrier 202 is molded of high-impact plastic according to conventional techniques and includes a shell 206 with an upper back rest and head rest portion 208, and a torso and leg rest portion 210. A head rest insert 212 is positioned in the head rest portion 208 and is preferably molded of a semirigid impact-absorbing material such as expanded polystyrene (EPS). The interior side-to-side distance of a preferred embodiment of the headrest insert 212 is approximately 310 mm.

Figure 23:
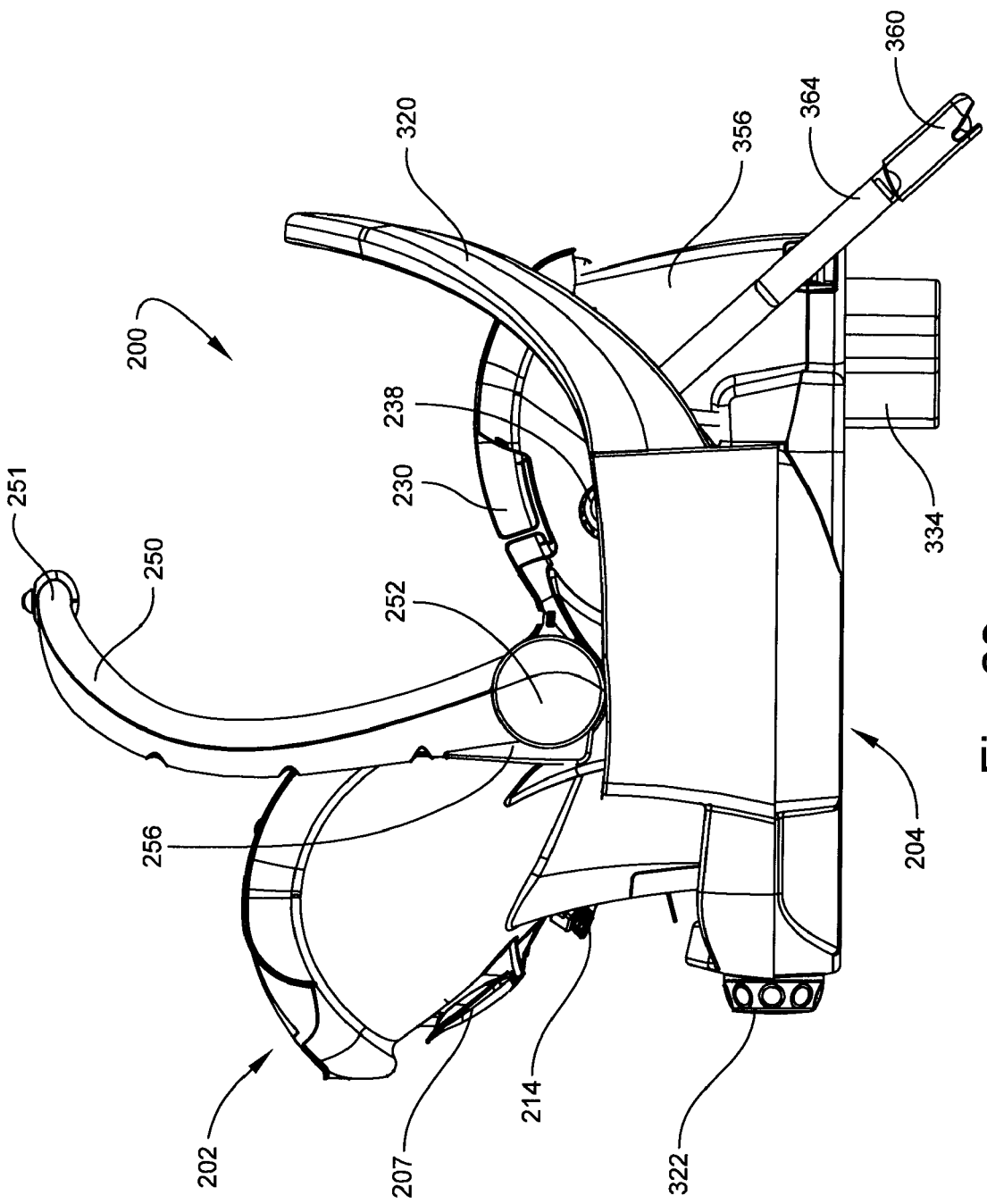
FIG. 23 is a side elevation of the child safety seat shown in FIG. 22.
Figure 24:
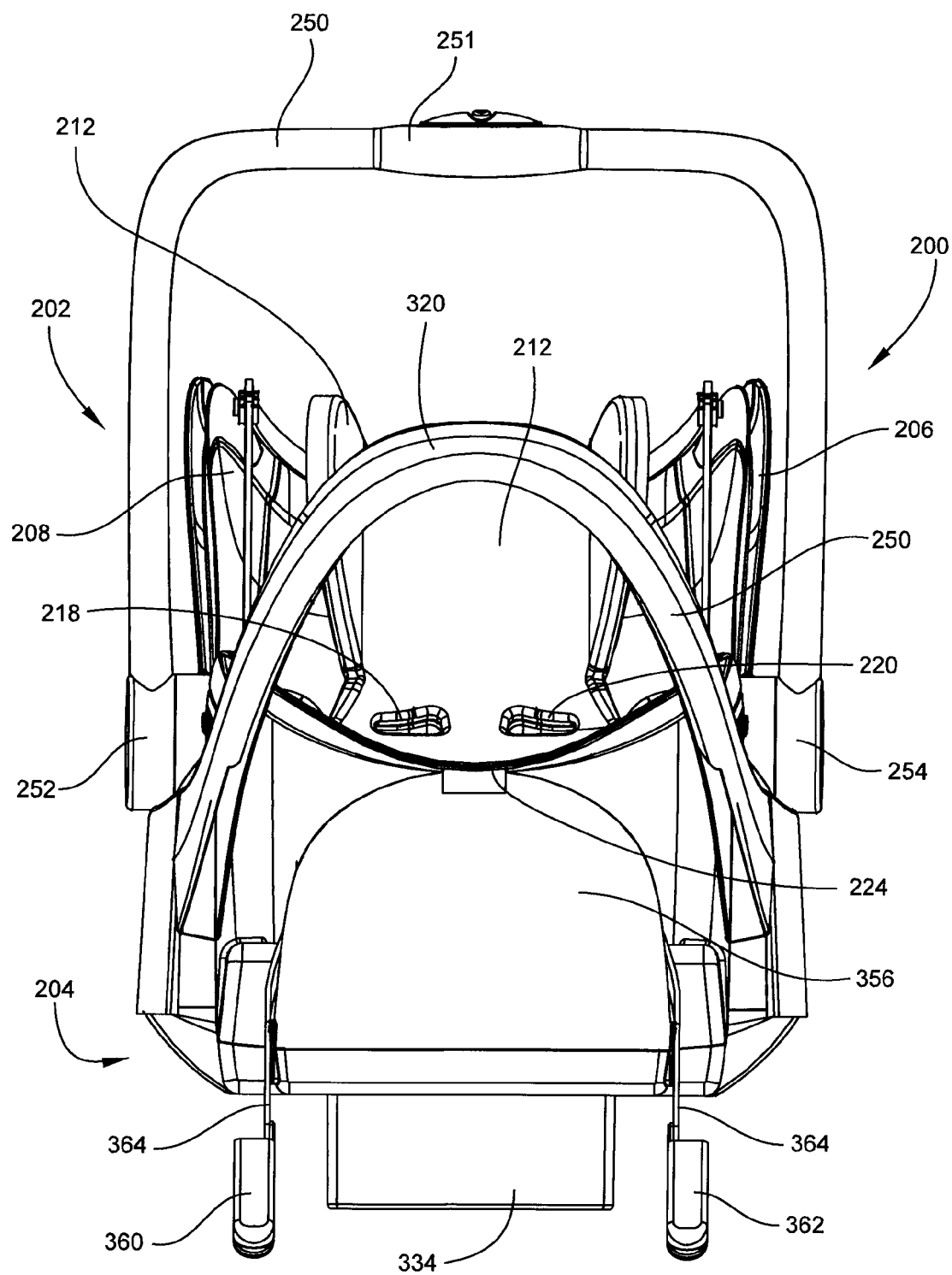
FIG. 24 is a front elevation of the child safety seat shown in FIG. 22.

As is best shown in FIG. 23, the head rest insert 212 is adjusted by means of an adjustment mechanism 214 that permits a controlled sliding of the headrest insert 212 along the surface of the headrest portion 208 of the shell 206. The back of the shell 206 also includes a belt guide 207.

Shoulder harness slots 218, 220 accommodate a pair of shoulder straps, not shown, that extend through the back of the shell 206 and pass over the shoulders of the seat occupant. The shoulder straps gain access to the exterior of the carrier 202 through slots in the padding and dress cover, as with the embodiment shown in FIGS. 1-20.

The shoulder straps are tightened by a latch 222, known as an "A-lock adjustor", positioned in an opening 224 in the leg rest portion 210 of the shell 206 that captures and retains a single latch strap that extends past the latch 224 and is tightened by pulling the strap through the latch 224. The latch strap is released by depressing the latch 224 to release an engagement with the strap to permit it to be withdrawn from the latch 224 by pulling on the shoulder straps.

The carrier 202 includes a pair of belt path inserts 230, 232 positioned on opposite sides of the carrier 202 that permit a vehicle seat belt to be extended laterally over the carrier 12, correctly positioned relative to the carrier 202 and retained in that position. A pair of side adjust inserts 234, 236 are positioned in the leg rest portion 204 of the carrier 202. The inserts 234, 236 include respective adjustment knobs 238, 240 that are positioned on respective threaded adjustment studs, not shown, and reside on the exterior surface of the carrier 202 outboard of the belt path inserts 230, 232. By rotating the knobs 238, 240, the effective width of the leg rest portion 210 can be adjusted inwardly or outwardly for maximum comfort and safety of the occupant.

Figure 21:
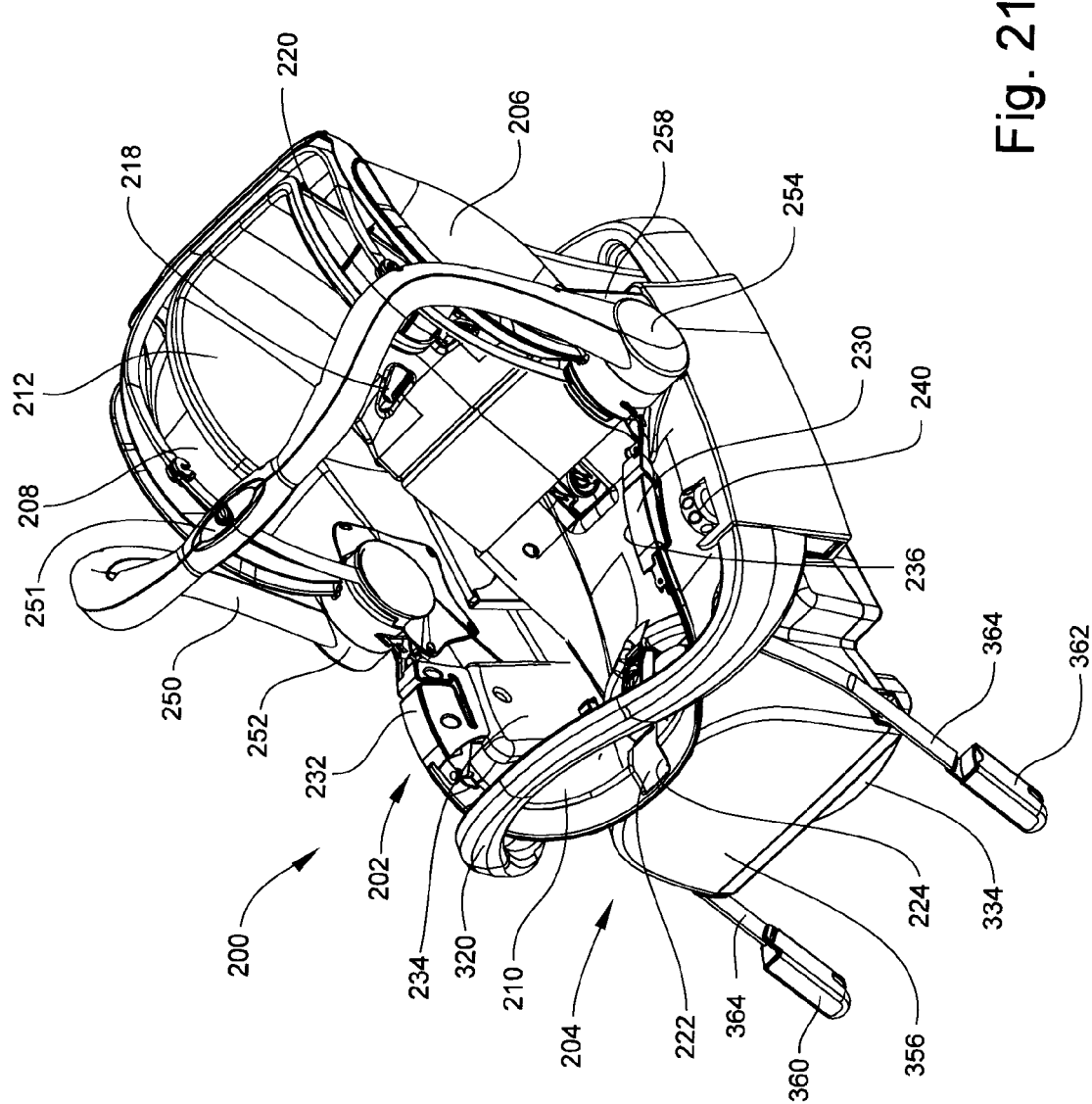
FIG. 21 is a perspective view of a modified embodiment of the child safety seat.
Figure 22:
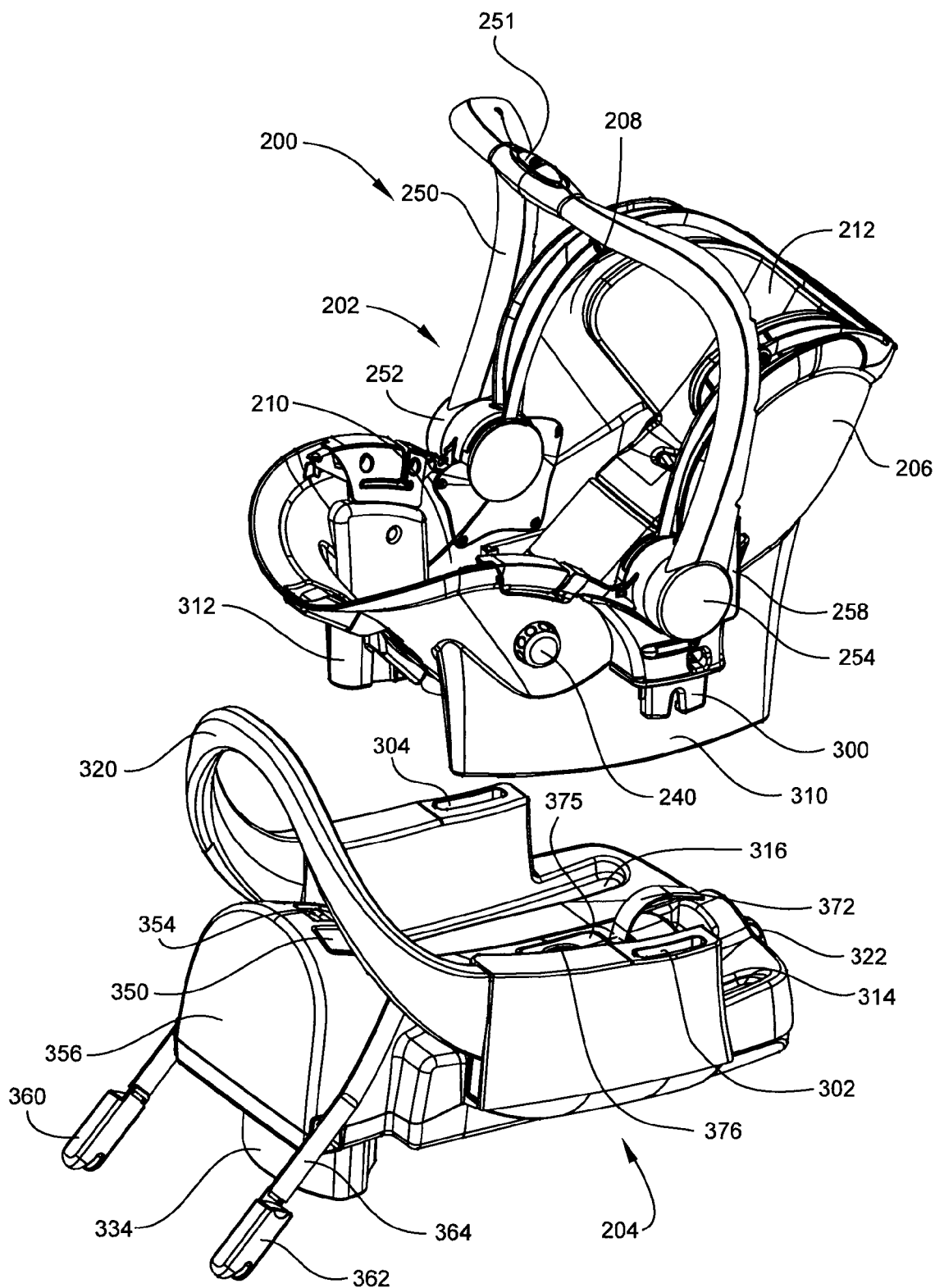
FIG. 22 is a separated view of the carrier portion and the base portion of a child safety seat similar to the one shown in FIG. 21, with the padding and dress cover removed for clarity.
Figure 25:
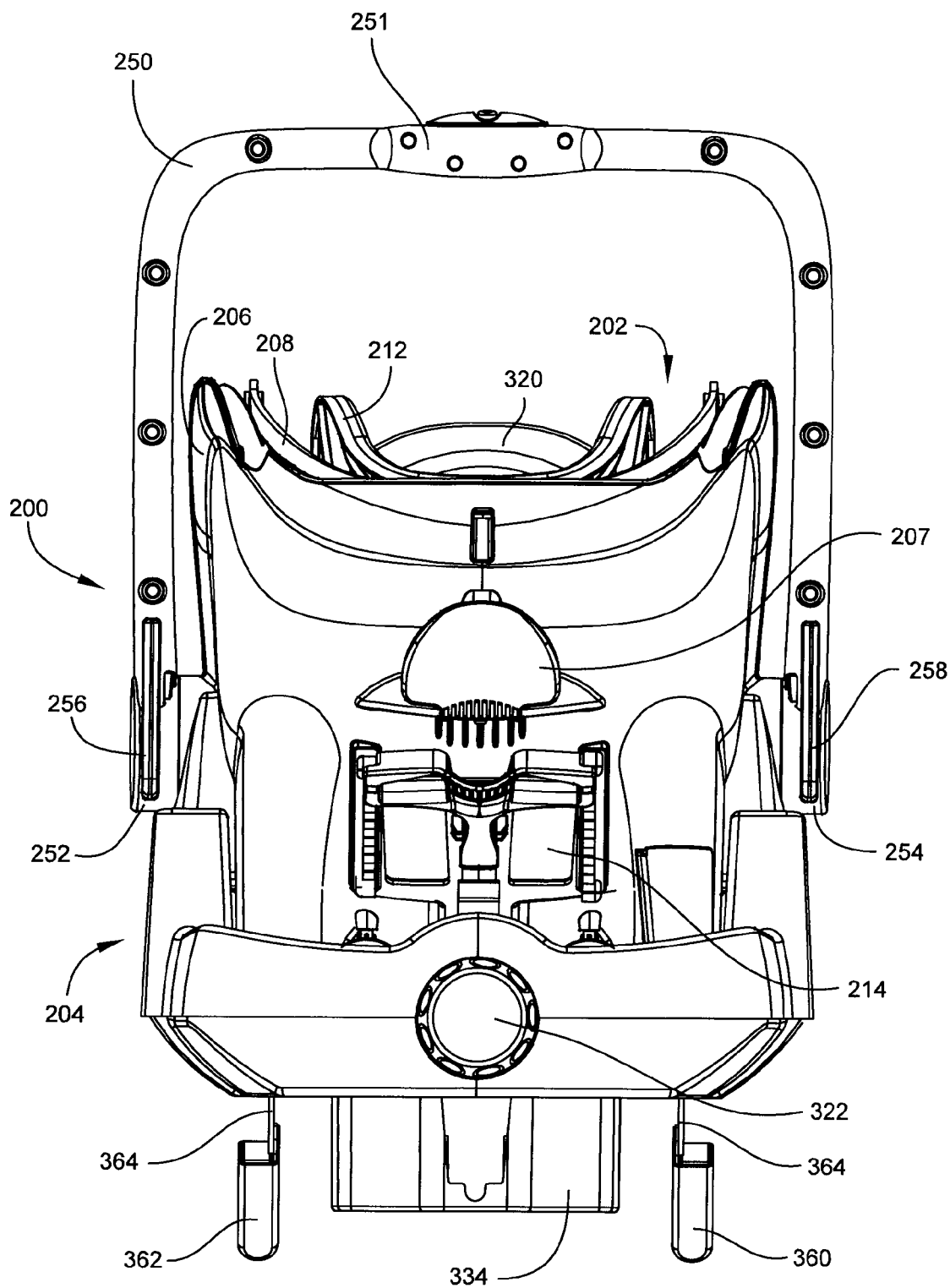
FIG. 25 is a rear elevation of the child safety seat shown in FIG. 22.
Figure 26:
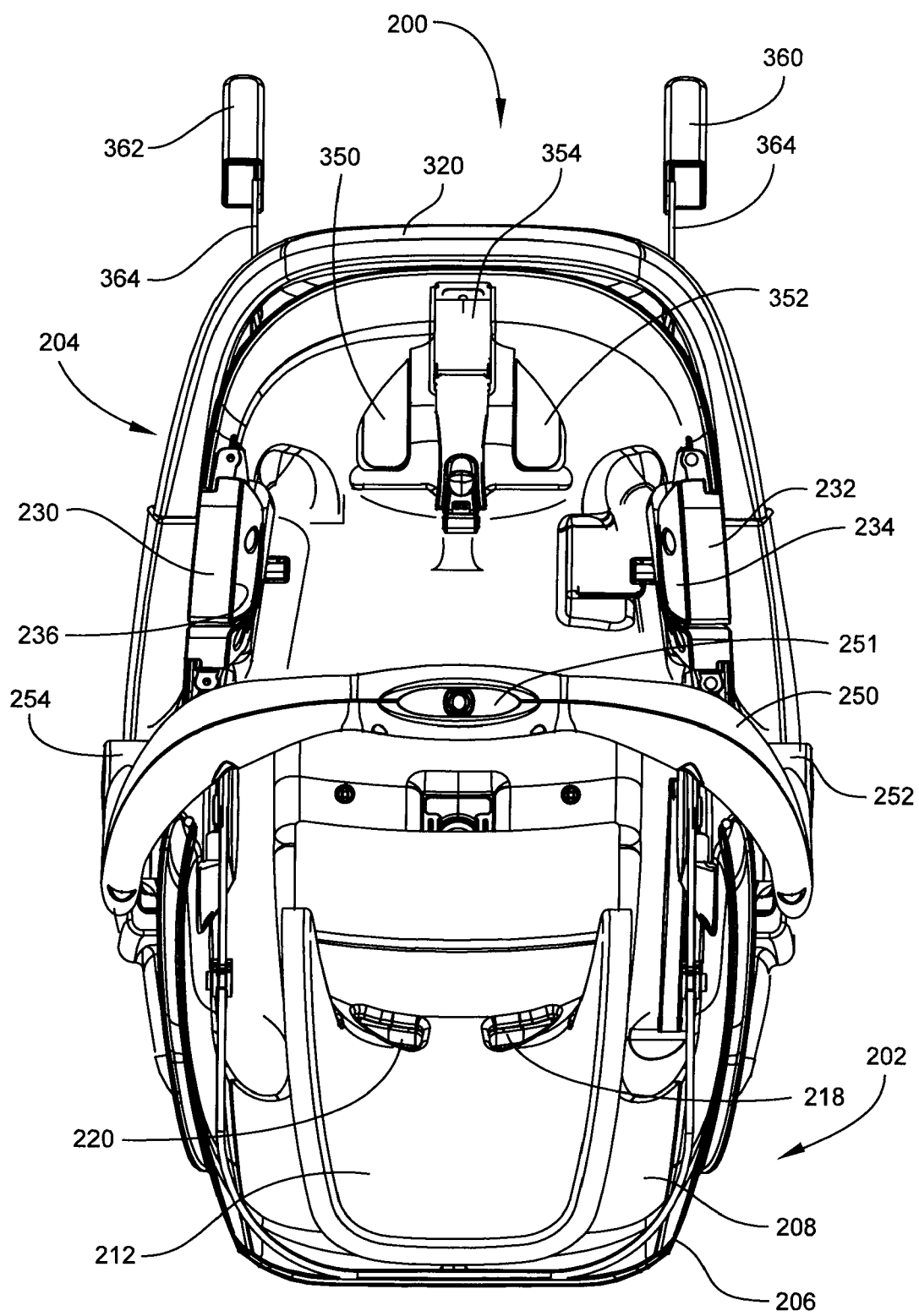
FIG. 26 is a top plan view of the child safety seat shown in FIG. 22.

The carrier 202 is lifted and carried by means of a carry handle 250 mounted to the carrier 202 by hubs 252, 254. As is best shown in FIGS. 21 and 25, rotation of the handle 250 to the desired position is achieved by releasing a pair of handle position locks 256, 258. Depressing both of the position locks 256, 258 simultaneously radially inwardly towards the respective hubs 252, 254 releases engagement between the position locks 256, 258 and respective mating locking mechanisms 259A, 259B in the hubs 252, 254 and allows the handle 250 to be rotated as desired. Releasing the locks 256, 258 locks the handle 250 into the desired position.

The handle 250 also operates as the means of unlocking the carrier 202 from the base 14. Several embodiments of a handle release are shown and described.

The handle 250 shown in FIGS. 21-28 and 36-40 includes a centrally positioned handle release 251 that also functions as a handle grip. Note that the handle release 251 may be either on a top surface of the handle 250, as in, for example, FIG. 1, or on the bottom surface, as shown in FIG. 15. Refer to the explanation above with reference to FIG. 15 for an explanation of the operation of handle release 251, which operates in the same manner described with reference to FIG. 15, above.

Referring now to FIGS. 37 through 40, one embodiment of a handle release is shown in an exploded view at 260 and includes a slide button top cover 262 that fits onto the center portion of the handle 250. A button 264 is mounted on a slide actuation spring 266 carried on a slide button bottom plate 268. The slide bottom plate 268 is mounted on a slide support 270, the other side of which supports a cable swivel plate 272. The cable swivel plate 272 is maintained in a normally neutral, locked position by a torsion spring 274 and the button 264, which extends upwardly into the slide button top cover 262. When the button 264 is depressed, the joined slide button top cover 262 and slide button bottom plate 268 are freed to move laterally along the handle 250, interfacing with and rotating a pivot 276. When the pivot 276 is thus rotated, the cables, omitted but attached and located at 278A, 278B, are pulled, releasing the locking mechanisms 259A, 259B.

Referring to FIGS. 41-45, another embodiment of a handle release is shown. Handle 250 includes a handle release 280 that has a two-motion release carried out by first depressing a button 282 out of interference relation with a slot 284 in the underside of the handle release 280, and then sliding the button 282 in one direction in the slot 284 to pull the cables 285 and open the Isofix latches.

Figure 42:
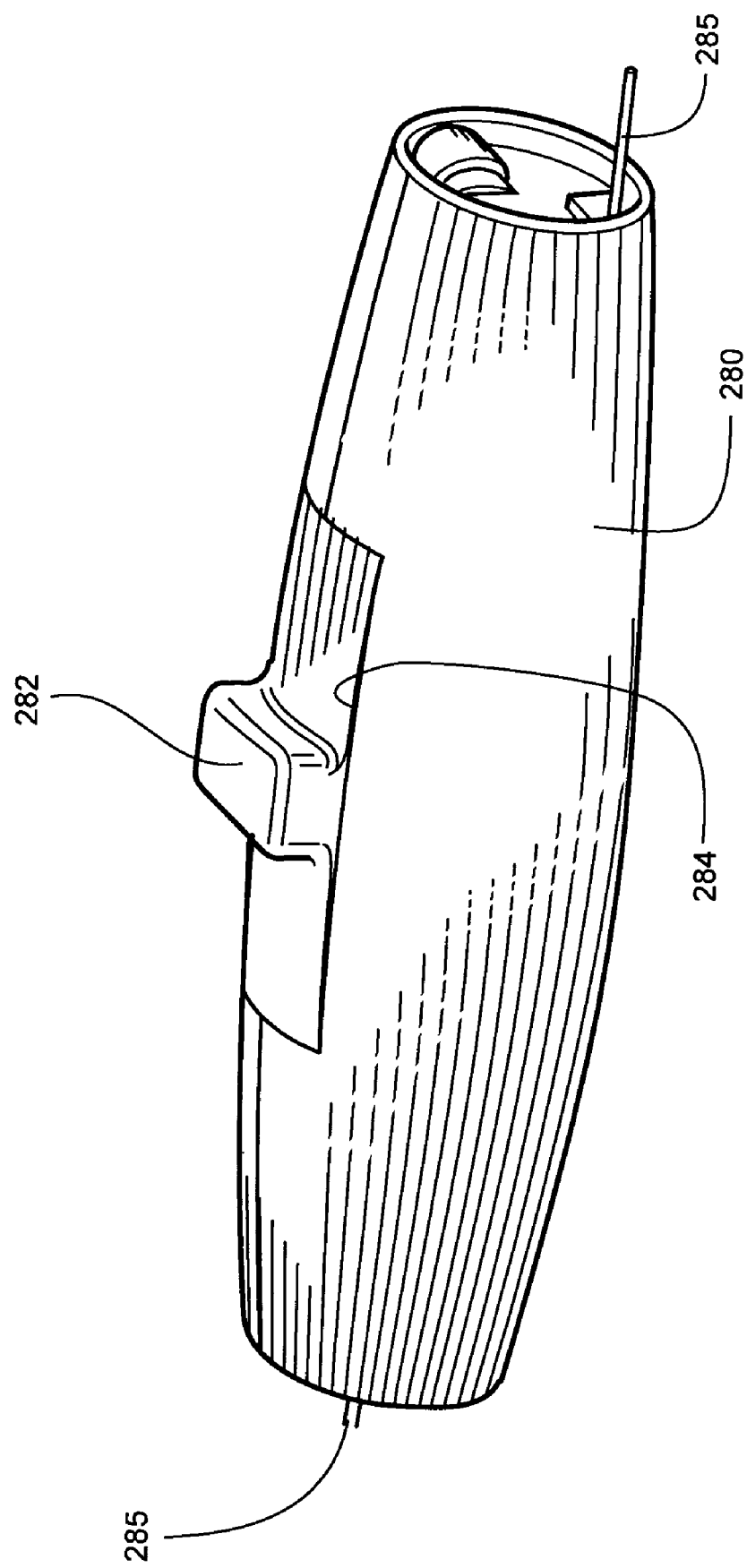
FIG. 42 is a perspective view of the handle grip of the carry handle shown in FIG. 41.
Figure 43:
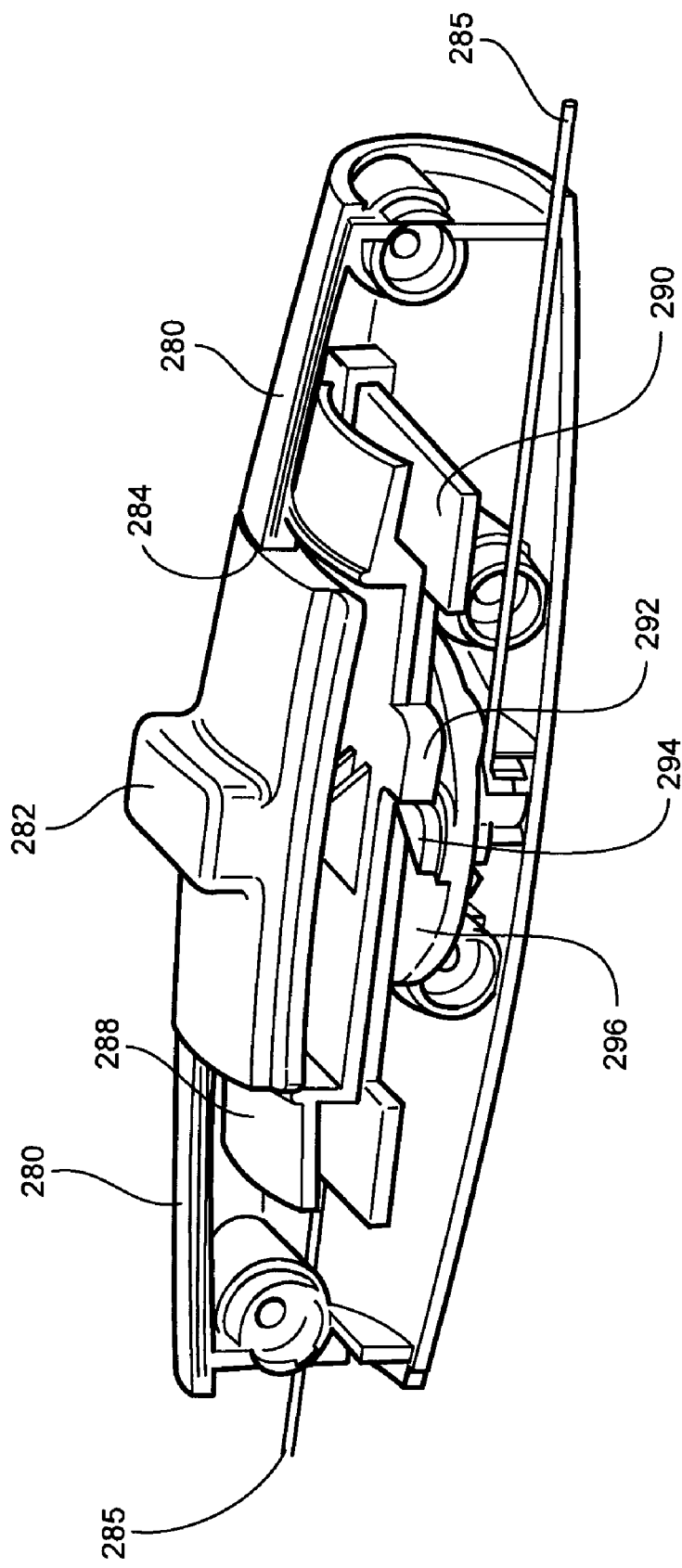
FIGS. 43-45 are sequential cutaway perspective views of the handle grip shown in FIG. 42.
Figure 44:
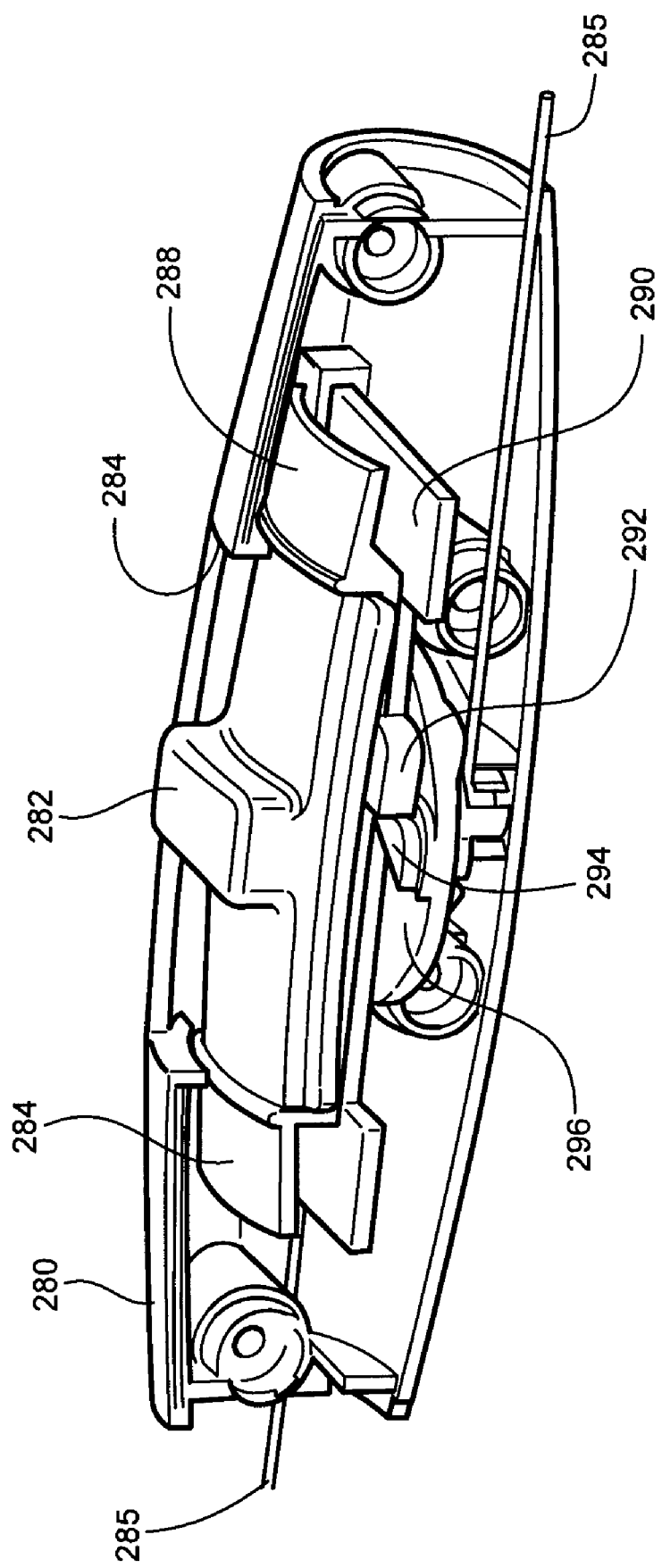
Figure 45:
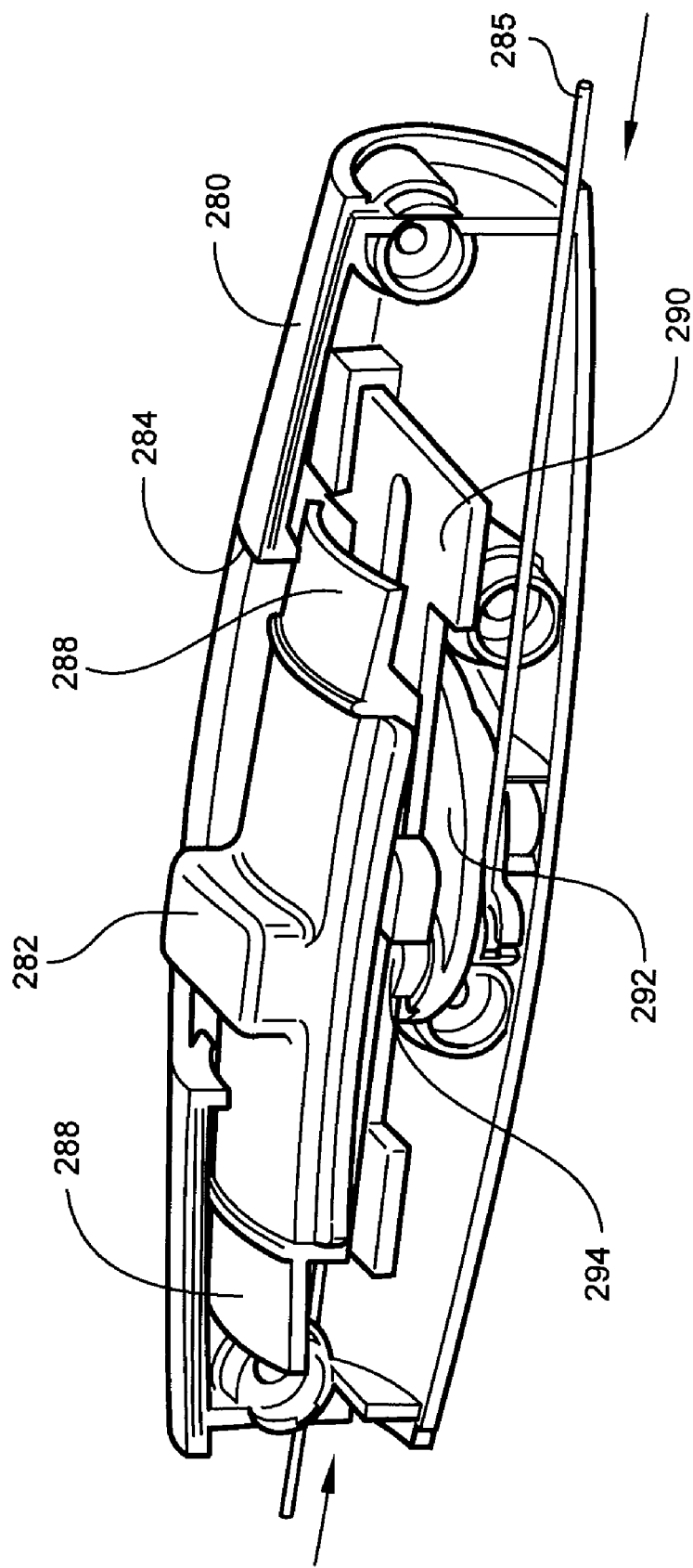

More specifically, the button 282 is shown in the normal, latched position in FIG. 42 and in the cutaway view of FIG. 43. The sidewalls of the slot 284 permit the button 282 to be depressed, but prevent sliding movement. In FIG. 44, the button 282 is depressed so that the peripheral edges of the button 282 are below the level of the slot 284 and reside within a slide button carrier 288. The slide button carrier 288 is mounted on a cable slide plate 290 that has an outwardly-projecting lug 292 that engages an upwardly-projecting lug 294 on a cable swivel 296. When the cable slide plate 290 slides, the lug 292 engages the lug 294, causing it to rotate sufficiently to retract the cables 285 and unlatch the carrier 202 from the base 204. Compare FIGS. 44 and 45.

Features of the base 204 are now described with reference to FIGS. 21-35. Isofix latches 300 of the carrier 202 fit into respective slots 302, 304 in the base 204. The slots 302, 304 contain respective locking bars 306, 308 that capture the Isofix latches 300, and lock the carrier 202 and base 204 into a single unitary structure. The carrier 202 and base 204 are further stabilized and maintained in a fixed position with relation to each other by means of a pair of relatively large, elongate feet 310, 312 that fit into mating elongate recesses 314, 316 formed in the head end of the base 204.

The base 204 includes a curved anti-rebound bar 320 that projects outwardly and upwardly from the foot end of the base 204 and engages the seat back of the vehicle seat to which the seat 200 is attached. In the event of an impact or sudden change in velocity of the vehicle in which the seat 200 is carried, the anti-rebound bar 320 retards inertia-induced rotation of the base 204 and the attached carrier 202 by transmitting rotational force applied to the seat 200 into the seat back of the vehicle seat onto which the seat 200 is attached.

Figure 27:
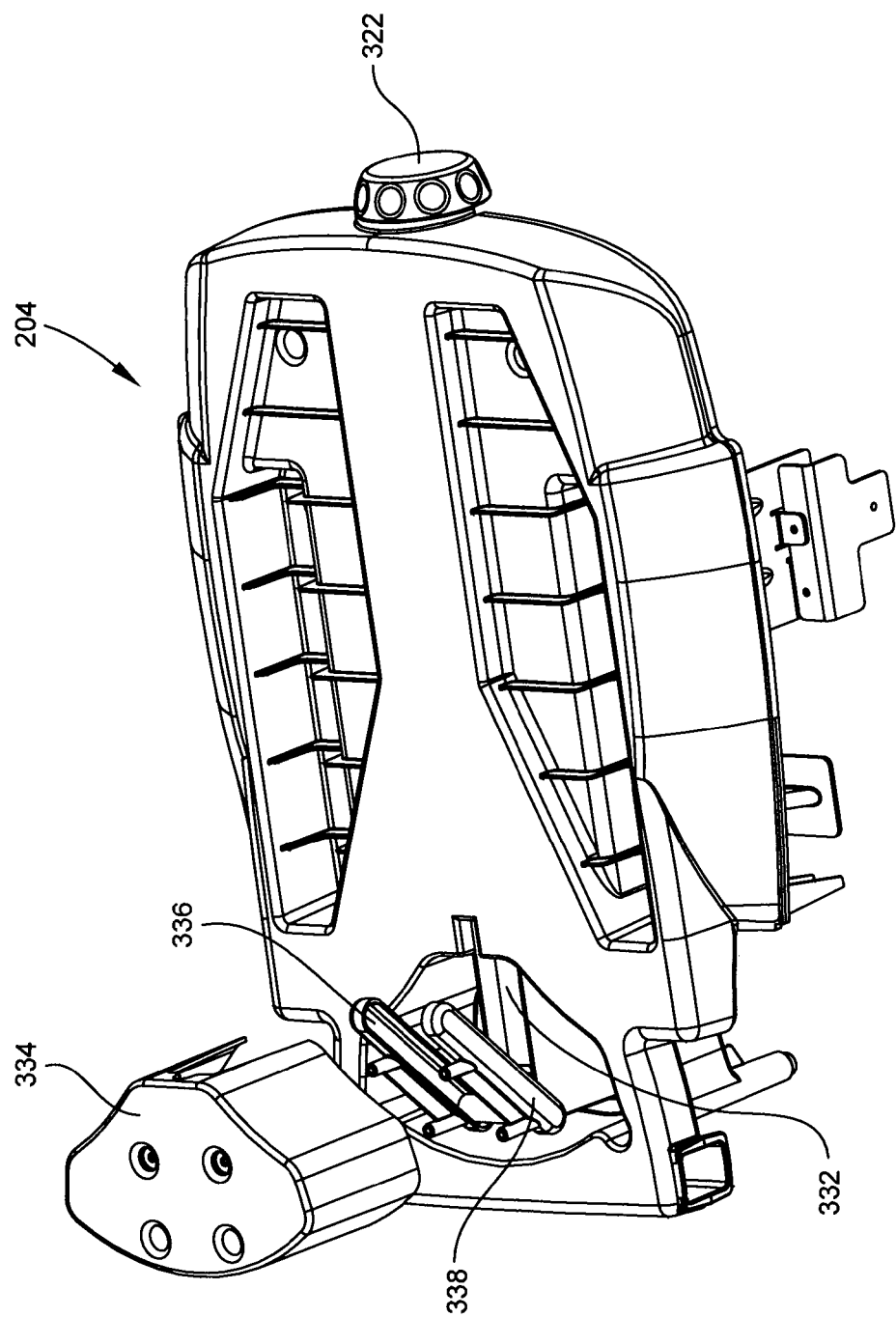
FIG. 27 is a bottom perspective view of the child safety seat shown in FIG. 22, with parts broken away to reveal details of the operation of the recline block adjustment.
Figure 28:
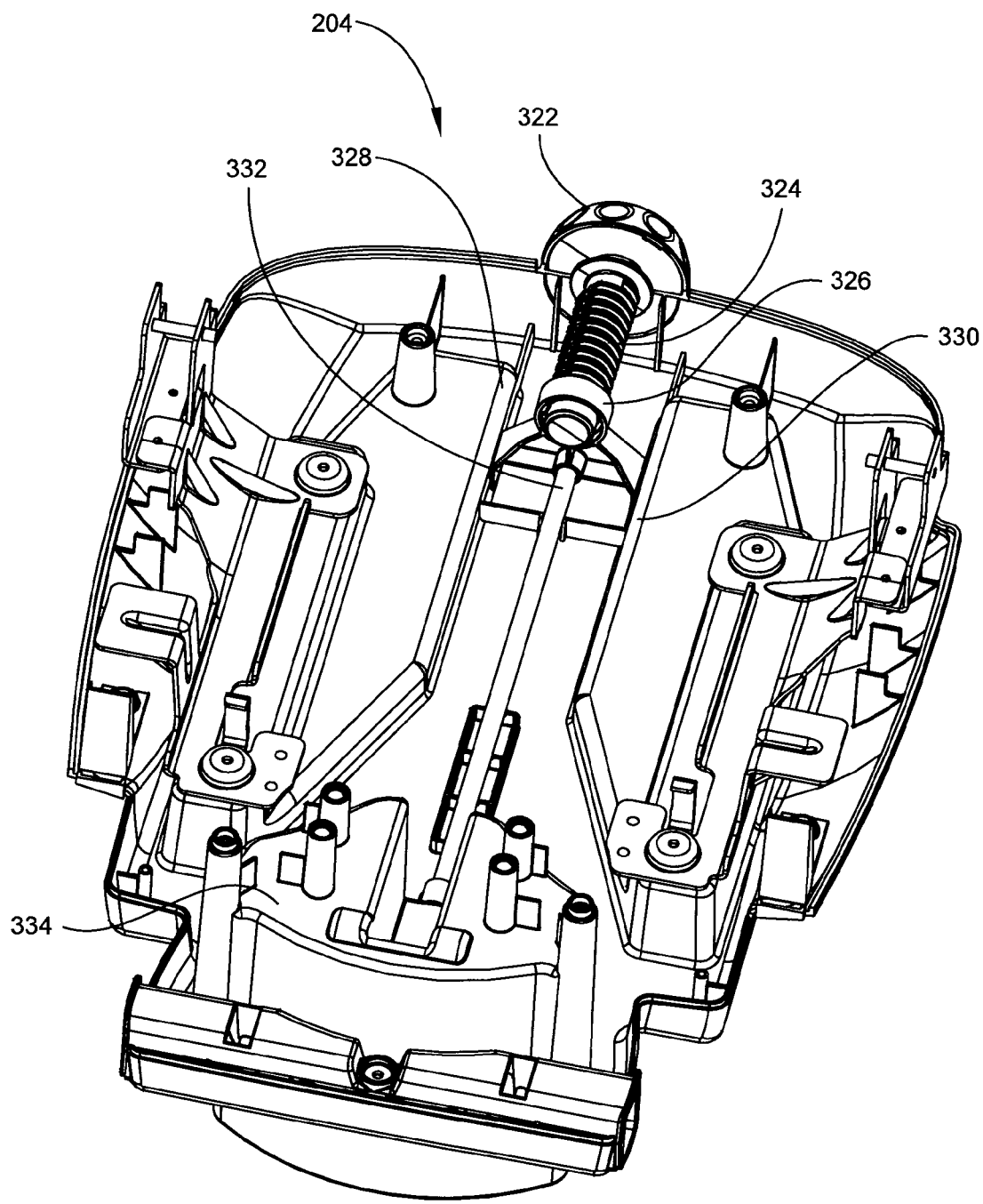
FIG. 28 is a bottom perspective view of the child safety seat shown in FIG. 22, with the top half of the base removed to reveal further details of the operation of the recline block adjustment.
Figure 29:
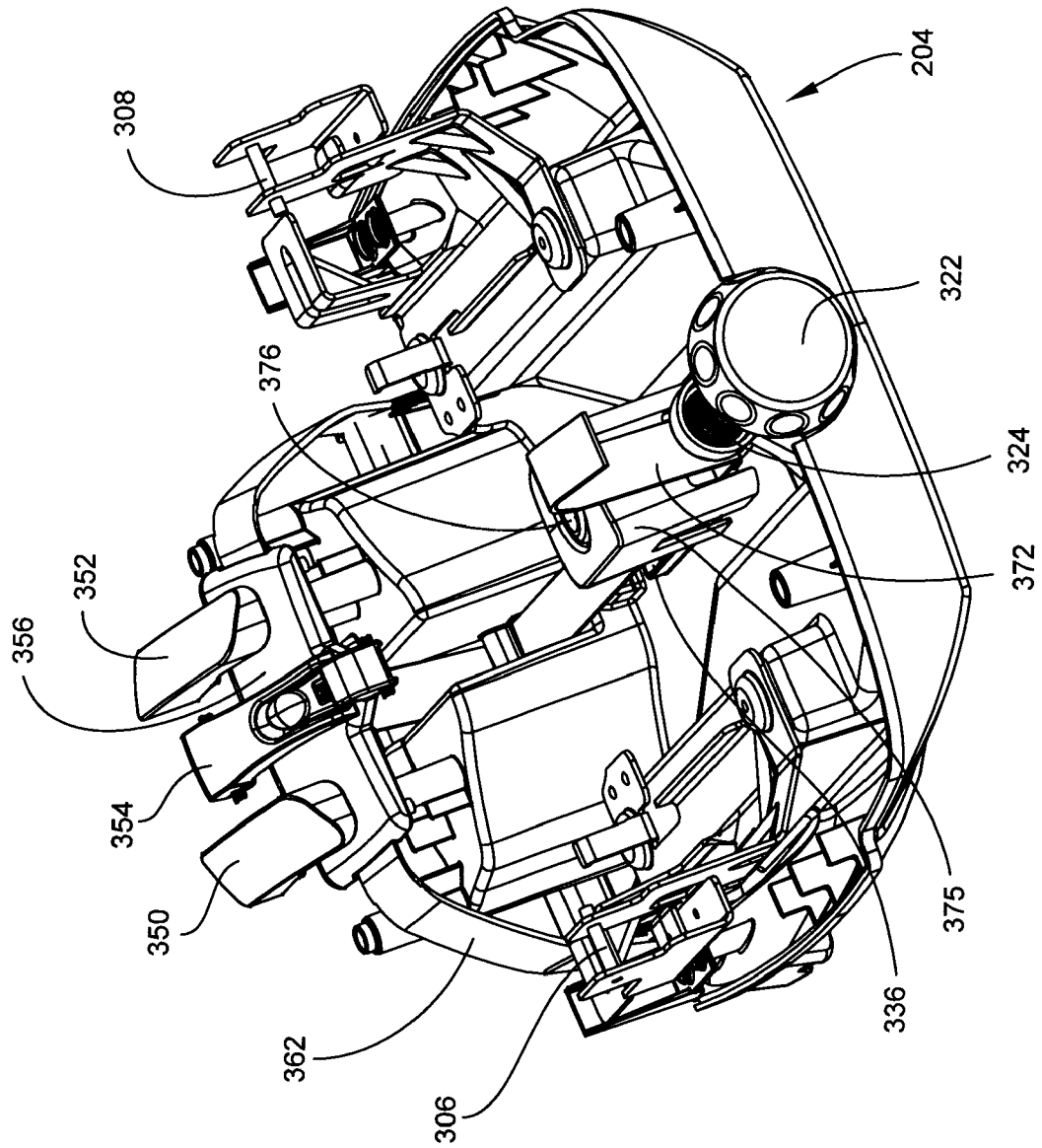
FIG. 29 is a perspective view of the seat base shown in FIG. 22, with the top cover removed to show internal elements.
Figure 30:
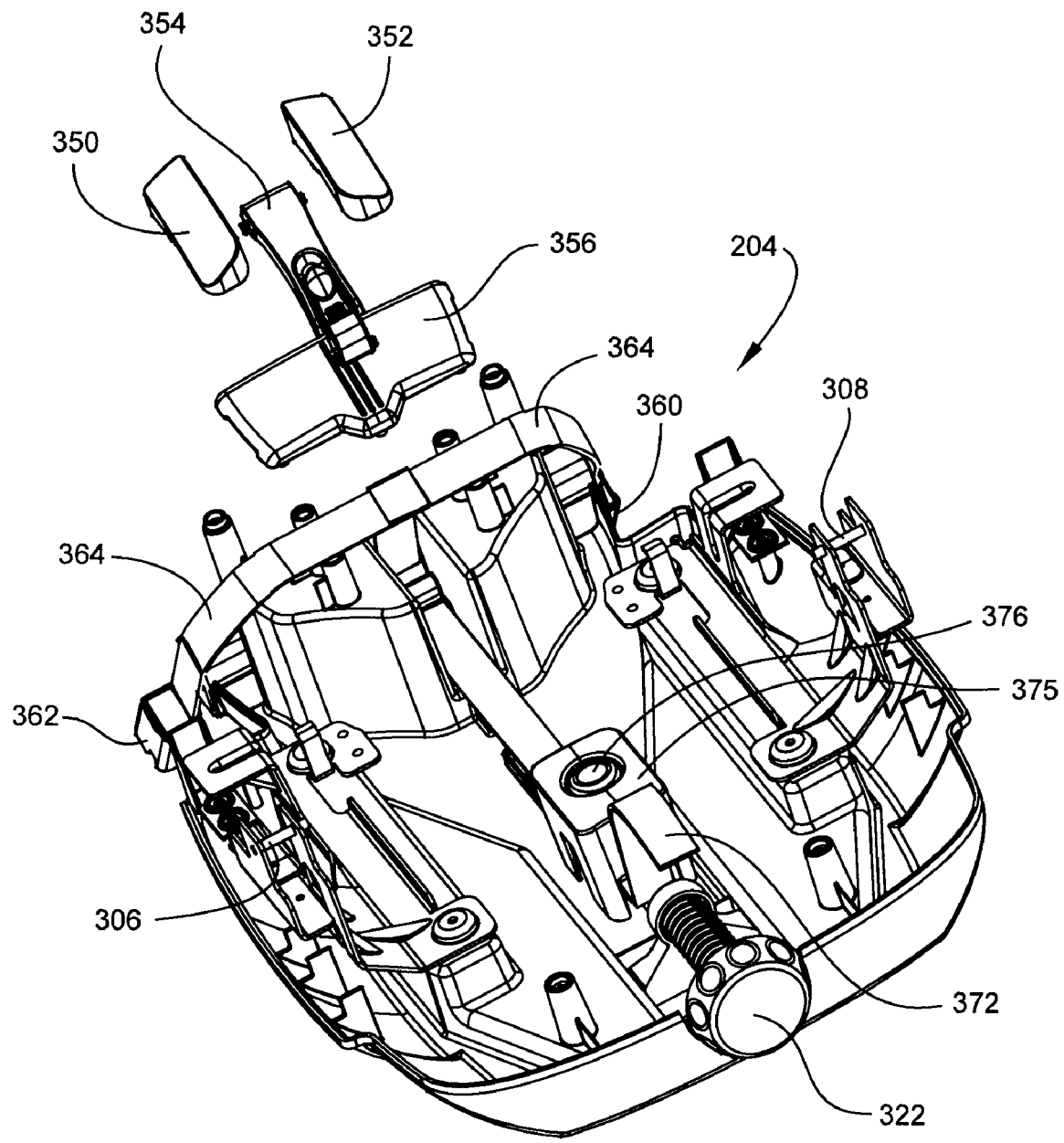
FIG. 30 is a perspective view similar to FIG. 29 with parts exploded away for clarity.
Figure 31:
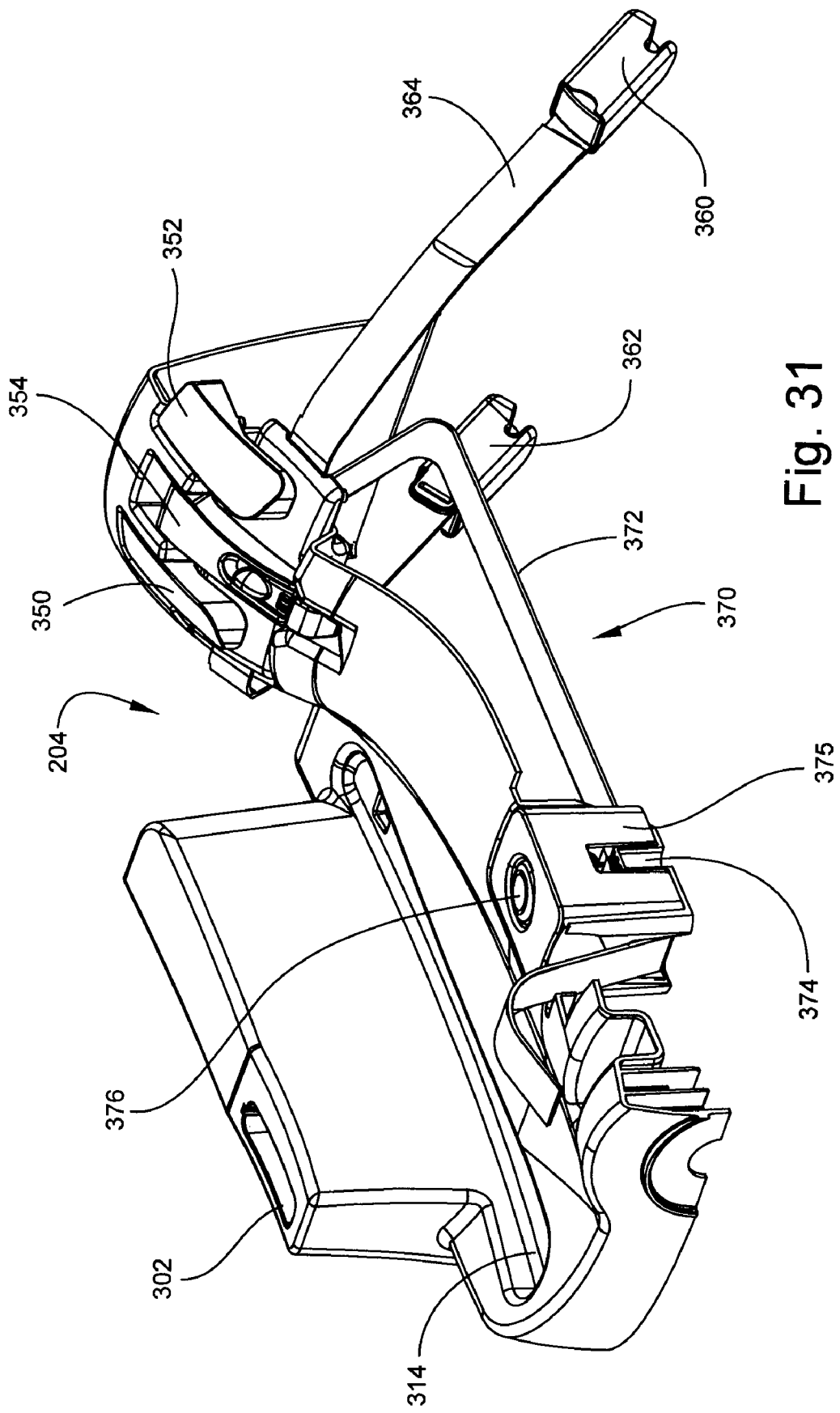
FIG. 31 is a perspective view, in cross section, of the base.
Figure 32:
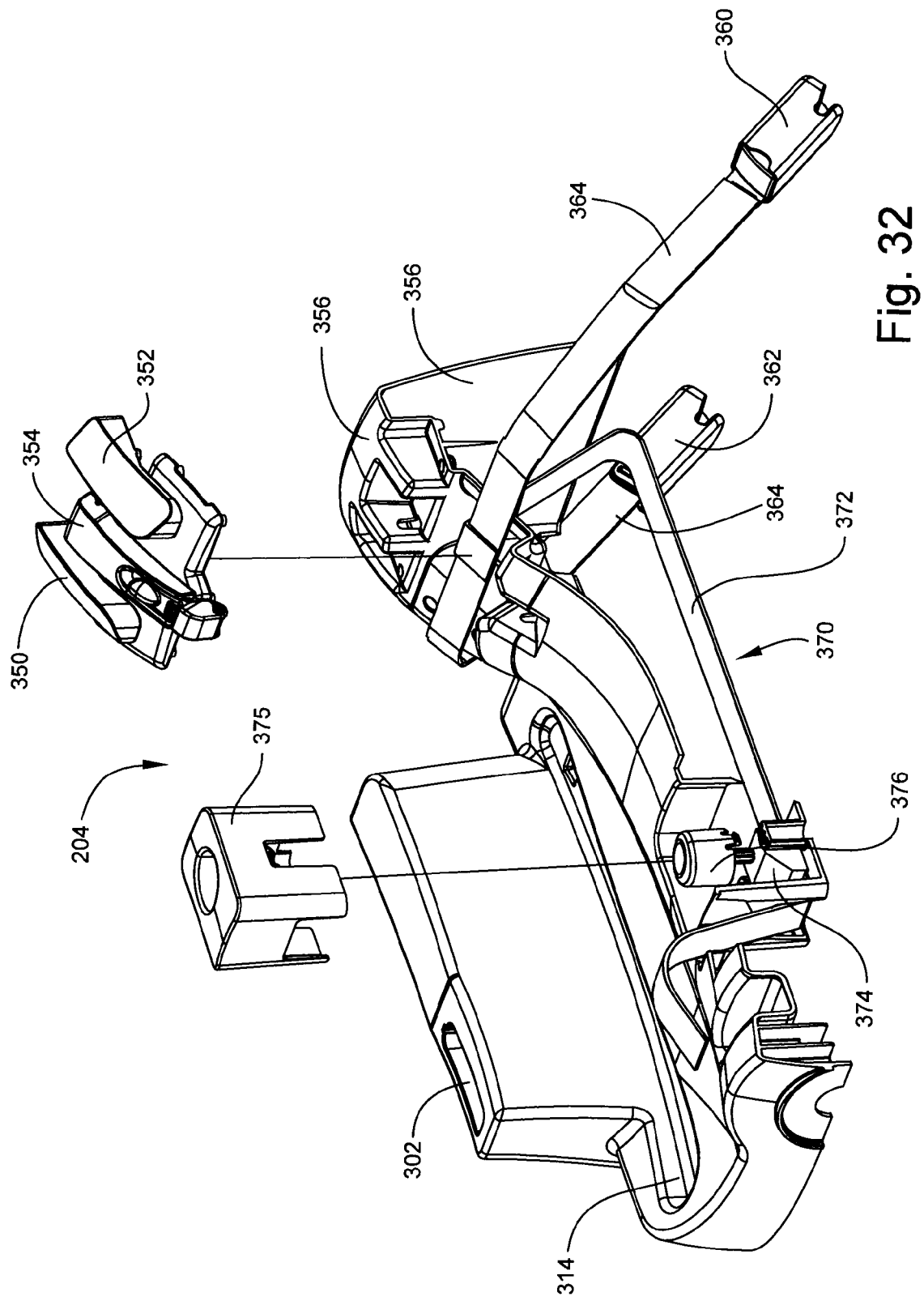
FIG. 32 is a perspective view similar to FIG. 32 with parts exploded away for clarity.
Figure 33:
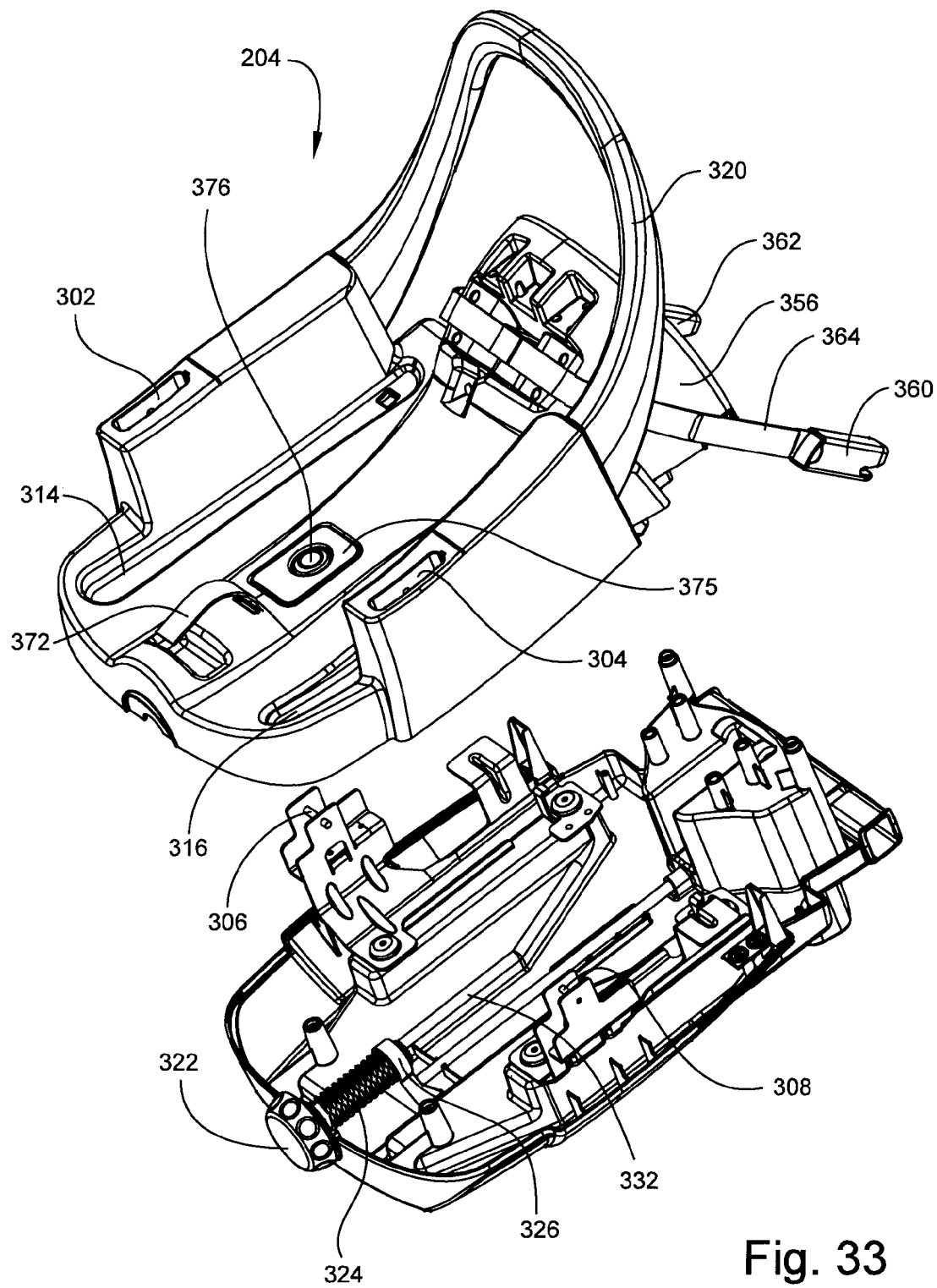
FIG. 33 is a perspective view of the seat base with the top half exploded from the bottom half.
Figure 34:
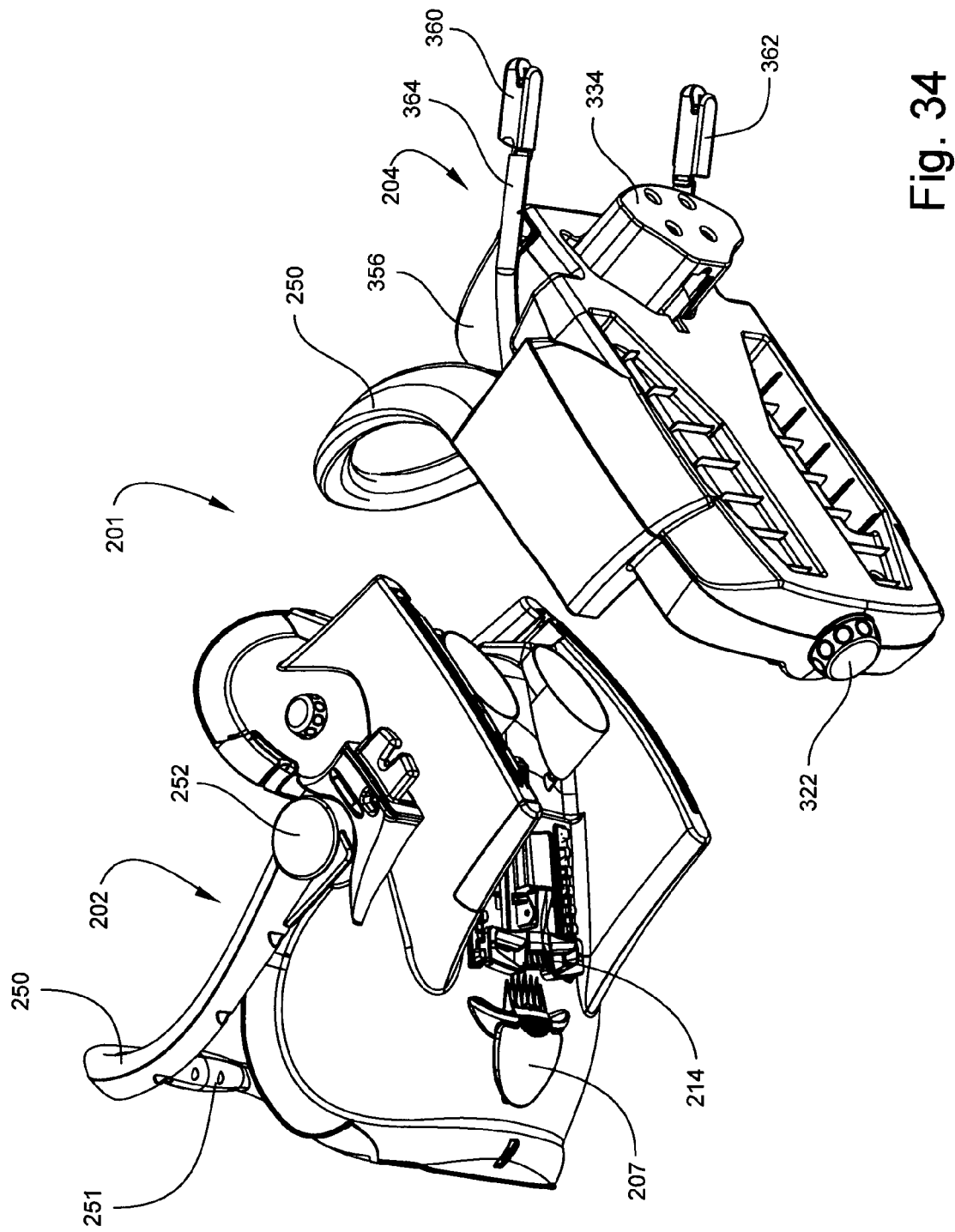
FIG. 34 is a perspective view of the child safety seat shown in FIG. 21 from the bottom rear quarter.
Figure 35:
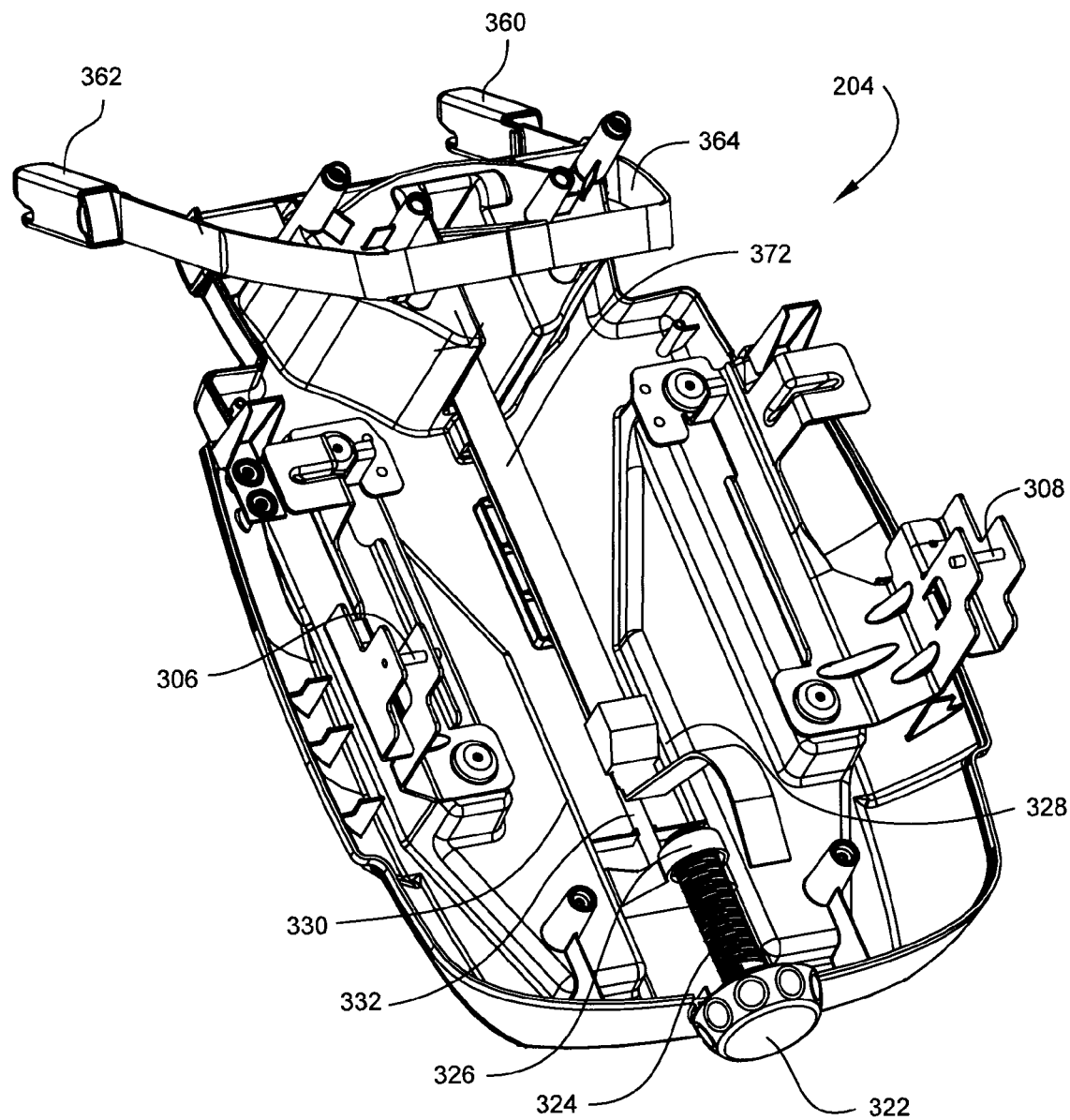
FIG. 35 is a perspective view of the bottom half of the base.
Figure 36:
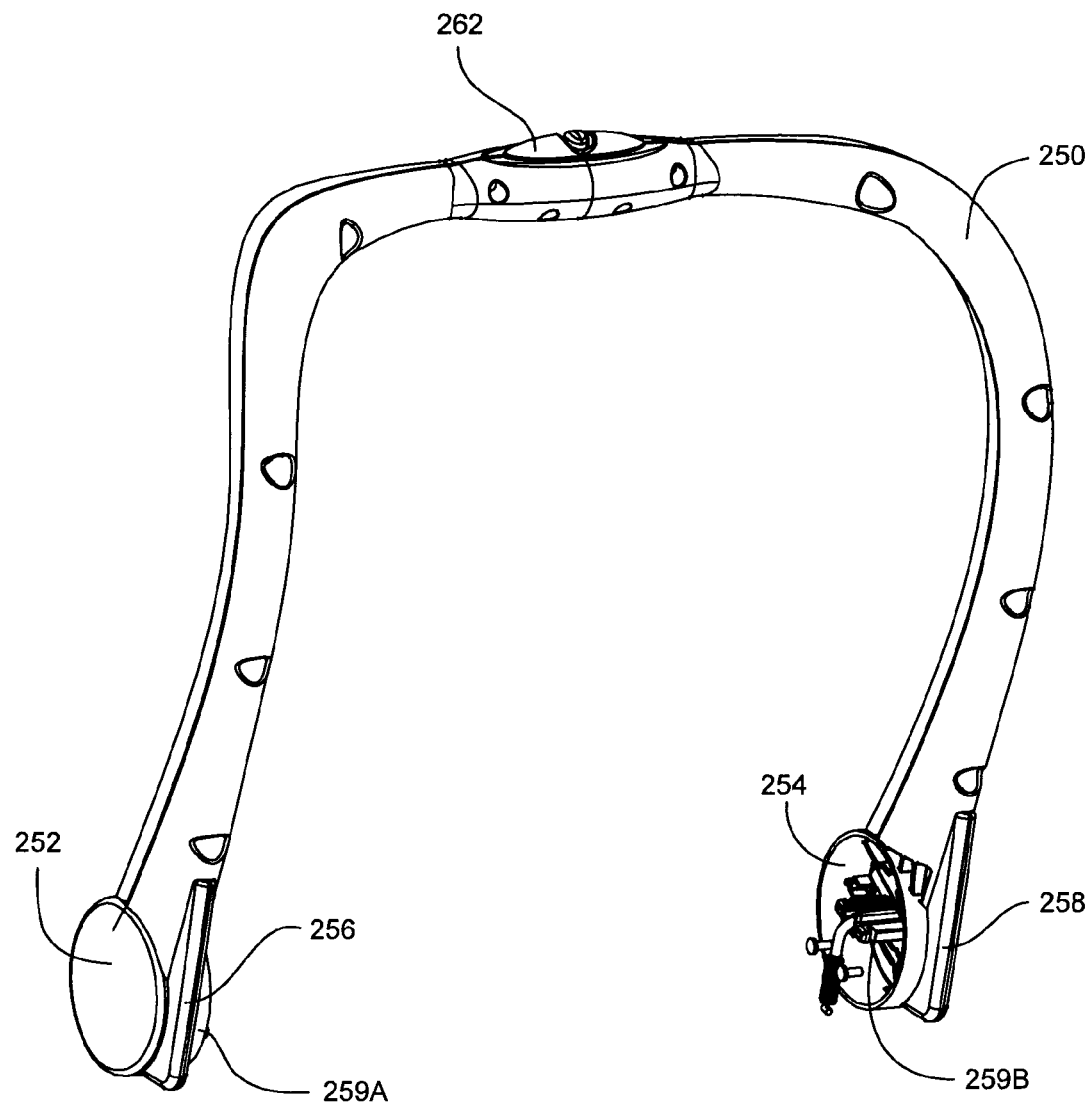
FIG. 36 is a perspective view of one embodiment of the carry handle.
Figure 37:
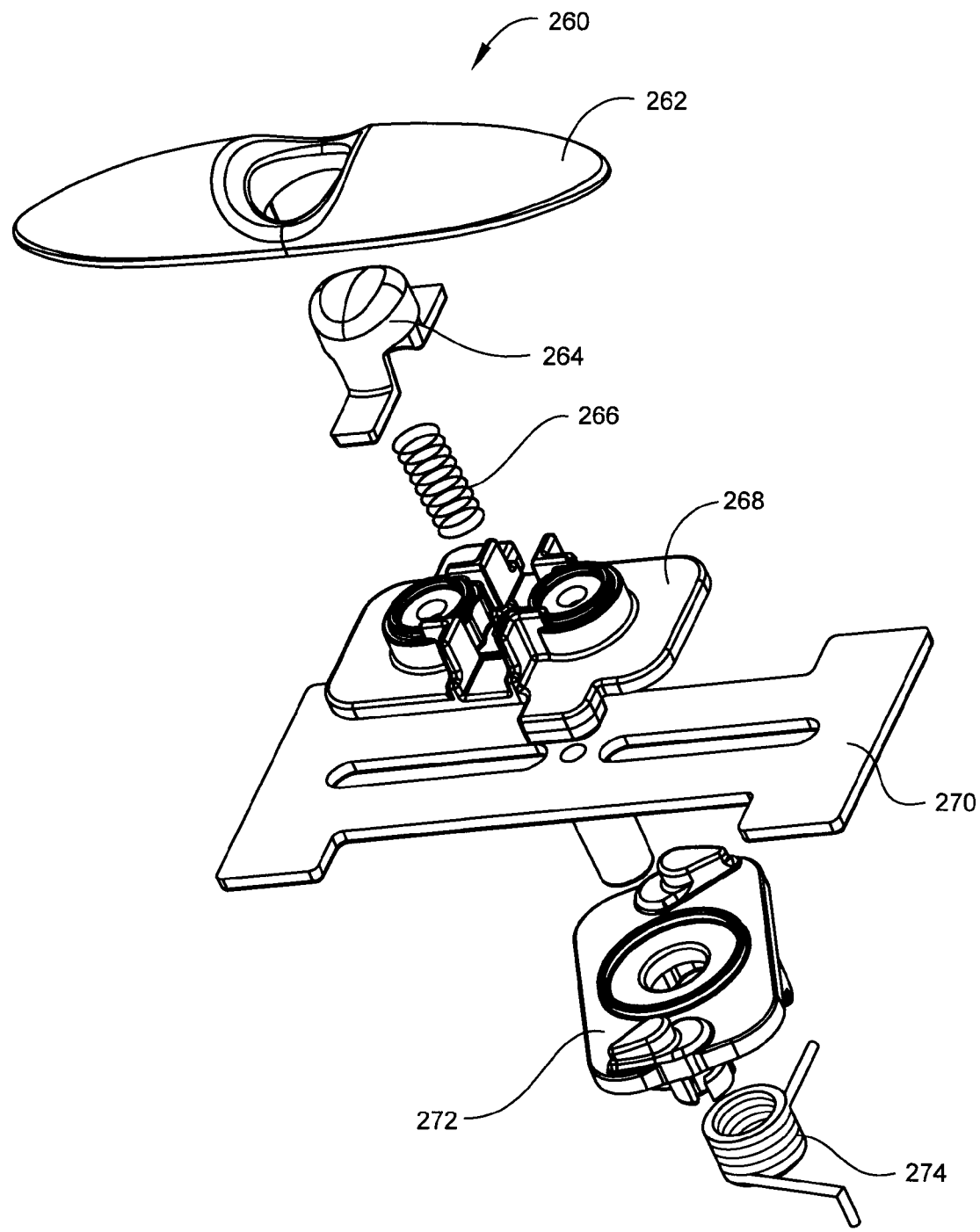
FIG. 37 is a top exploded view of the carrier release mechanism of the carry handle.
Figure 38:
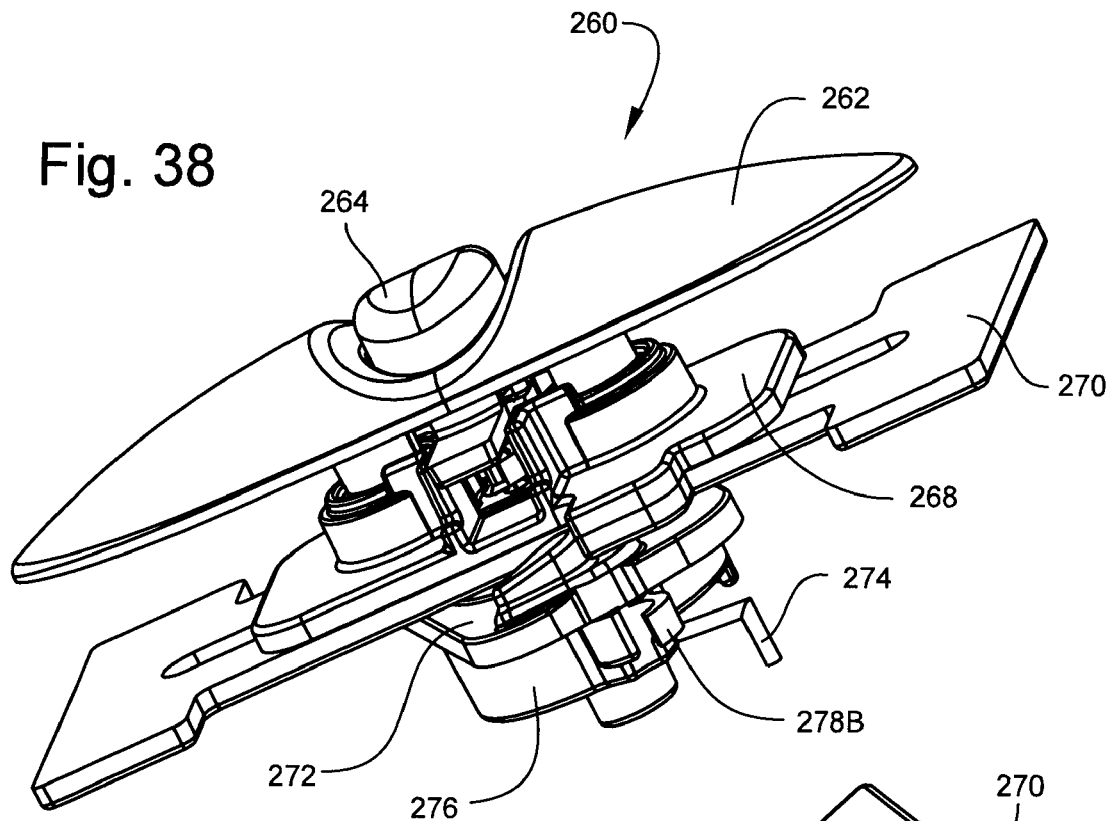
FIG. 38 is a top perspective view of the carrier release mechanism shown in FIG. 37.
Figure 39:
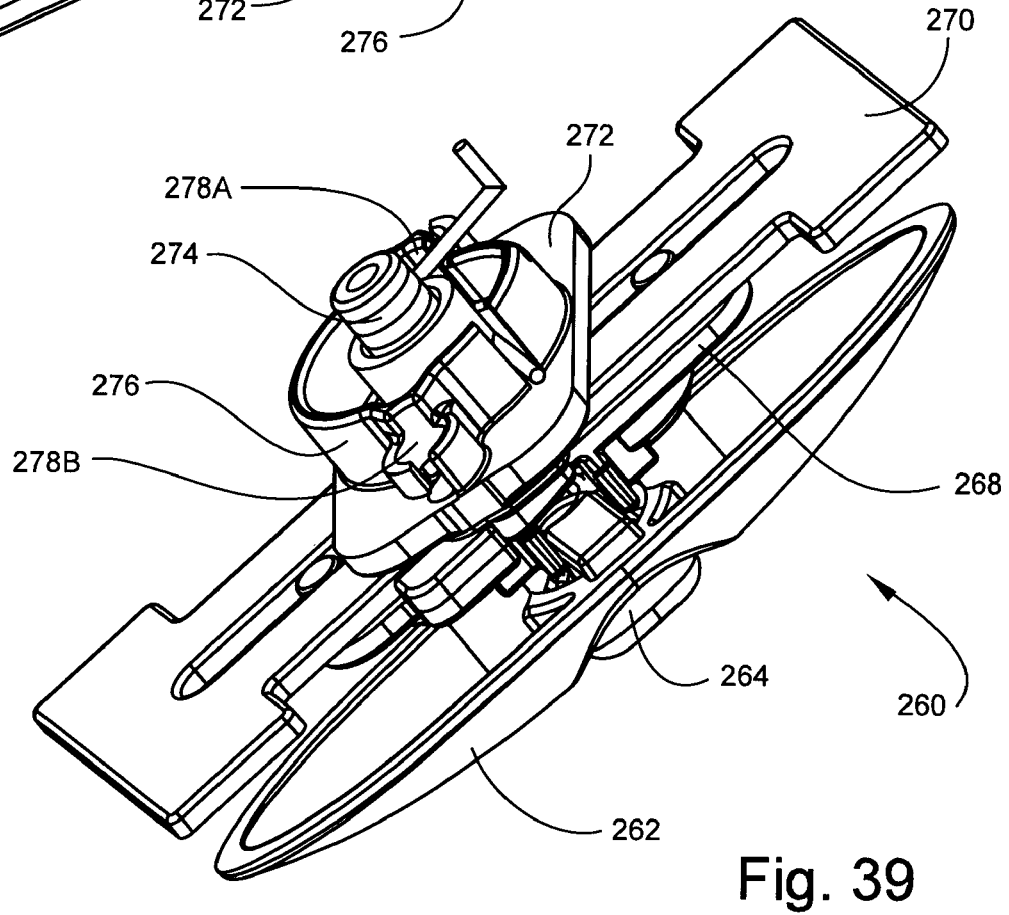
FIG. 39 is a bottom perspective view of the carrier release mechanism shown in FIG. 37.
Figure 40:
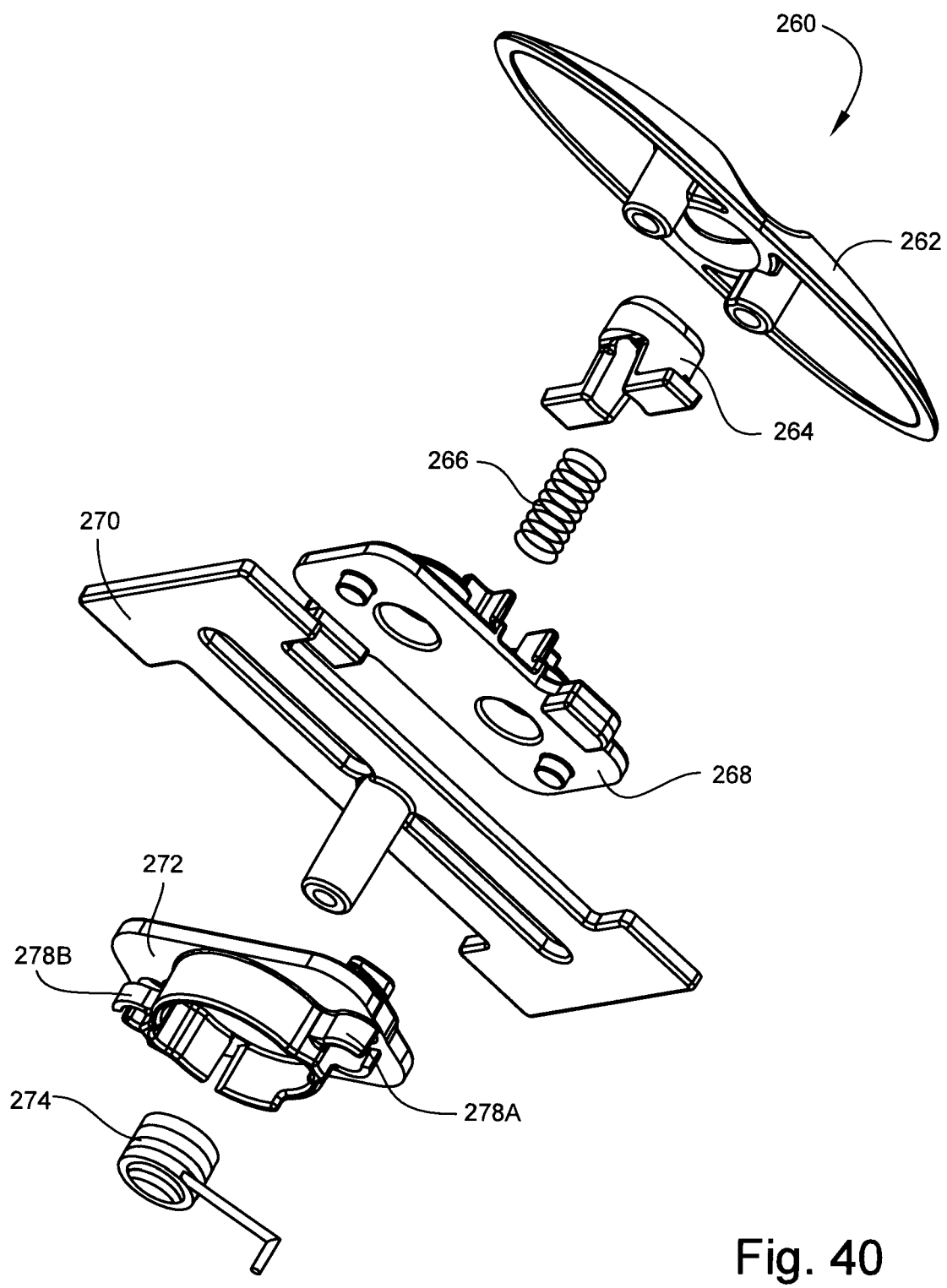
FIG. 40 is a bottom exploded view of the carrier release mechanism of the carry handle.
Figure 41:
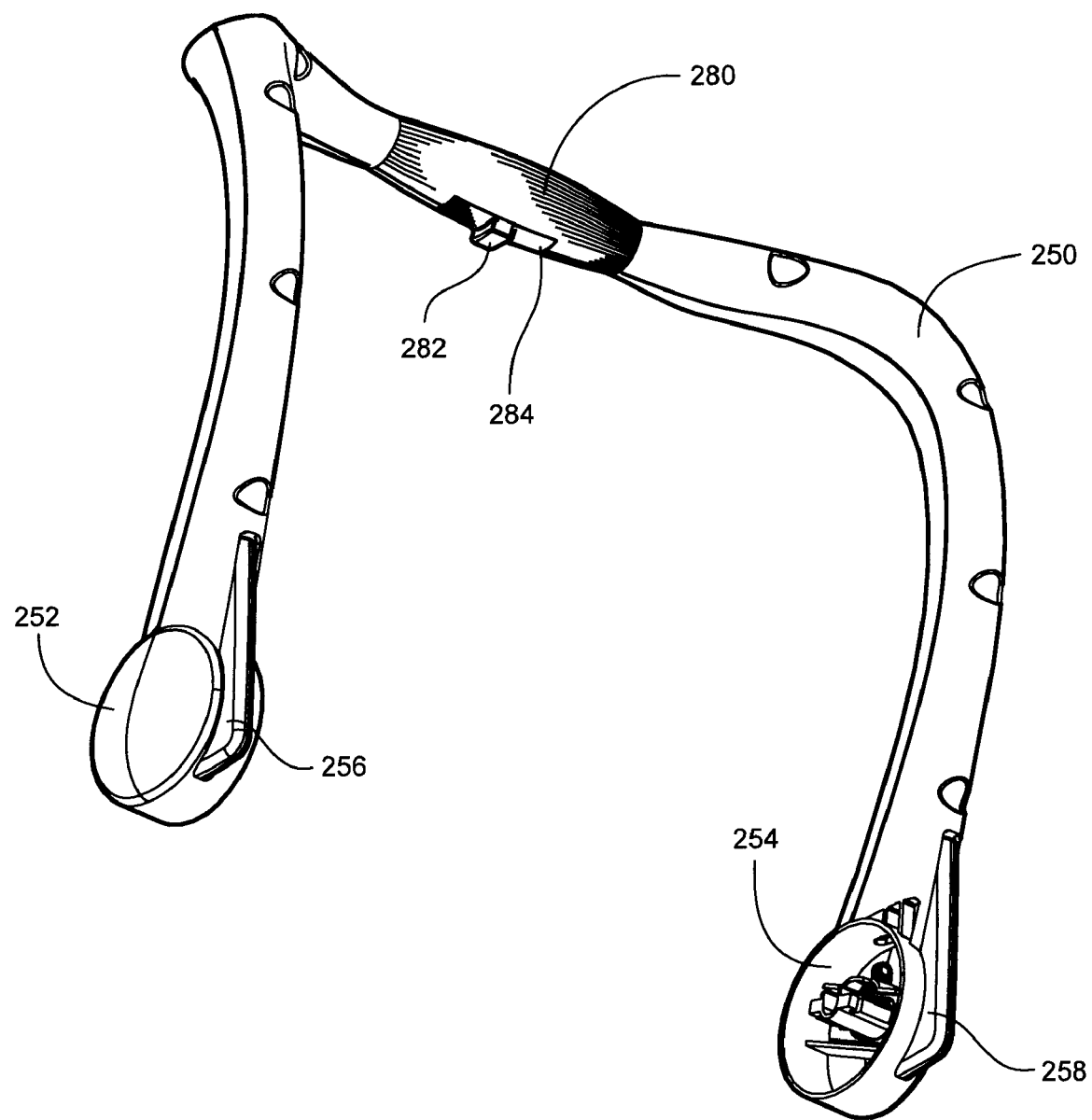
FIG. 41 is a perspective view of another embodiment of the carry handle.

Referring now to FIGS. 27 and 28, the base 204 is leveled on the vehicle seat bottom by a level adjustor knob 322. The knob 322, when turned, rotates a screw 324 mounted in a recline rod nut 326. The recline rod nut 326 is mounted between a pair of parallel tracks 328, 330 that extend part-way along the length of the base 204. The recline rod nut 326 carries a recline shaft 332 that extends along the length of the base 204 and into a recline block 334.

As is best shown in FIG. 27, the recline shaft 332 enters the recline block 334 and is attached to a pair of levers 336, 338 pivotally mounted in the recline block 334. As the level adjustor knob 322 is turned to retract the recline shaft 332, the levers 336, 338 pivot and the free ends of the levers 336, 338 bear downwardly against the bottom surface of the recline block 334 causing it to extend from the base 204 and lift head end of the base 204. Turning the level adjustor knob 322 in the opposite direction lowers the recline block 334. See also FIGS. 33 and 35.

Referring now to FIGS. 29-32, the base 204 also includes elements whereby the seat 200 may be secured to the vehicle seat by either use of the vehicle seat belt or "Isofix"-type latches. The base 204 includes a pair of spaced-apart belt hooks 350, 352 and a belt lock-off 354 mounted on the top of a housing 356 positioned on the foot end of the base 204. The belt hooks 350 and 352 are slightly spaced from the curved upper surface of the housing 356 and define spaces just sufficient to accommodate the thickness of the seat belt. The seat belt is extended laterally across the housing 356 under the belt hooks 350, 352 with the belt lock-off 354 in an open position. The belt lock-off 354, positioned between the two belt hooks 350, 352 is then locked down over the seat belt, preventing it from moving in either an extension or retraction direction. The housing 356 also acts as a support for the foot end of the carrier 202 and contains the recline block 334.

Alternatively, the base 204 may be secured to the vehicle seat by means of Isofix latches 360, 362 positioned on opposite ends of a latch connecting belt 364 that is positioned on the housing 356. The latches 360, 362 are thus fixed to the base 204 and mate to Isofix bars, not shown, positioned behind the vehicle seat bottom, that are now required on many vehicles.

The latch connecting belt 364 is joined at its midpoint to a single latch tensioning belt 372 that extends along the length of the base 204. The latch tensioning belt 372 is positioned in a "A-lock" 374, a commonly-used lock-off device, positioned at the mid-point of the base 204 between the front and rear ends that permits the extension and retraction of the Isofix latches 360, 362 as needed to secure the base 204 of the seat 200 to the vehicle seat. The A-lock 374 is protected by a cover 375 and includes an A-lock button 376. The A-lock 374 includes a pivoted latch member, not shown, that bears against the latch tensioning belt 372 such that the latch tensioning belt 372 can be pulled for tightening the Isofix latches 360, 362, but will resist loosening of the tension on the latch tensioning belt 372. When tension must be released on the latch tensioning belt 372, depressing the button 376 releases the pivoted latch member so that the latch tensioning belt 372 will pass through the A-lock 374 towards the latch connecting belt 364.

The Isofix latches 360, 362 may thus be extended to provide sufficient slack to allow them be latched onto the Isofix bars behind the vehicle seat, and then retracted by pulling on the latch tensioning belt 372, thereby drawing the base 204 towards the vehicle seat. When released, the A-lock 374 maintains the latch tensioning belt 372 in the desired, tensioned position and thus secures the base 204 in the desired position.

The base 204 may optionally include a foot prop 150 substantially as shown and described in FIGS. 13 and 16 with reference to the seat 10 and its base 14.

An improved child safety seat is described above. Various details of the invention may be changed without departing from the scope of the invention. Furthermore, the foregoing description of the preferred embodiment of the invention and best mode for practicing the invention are provided for the purpose of illustration only and not for the purpose of limitation, the invention being defined by the claims.

We claim:

1. A child safety seat, comprising
  (a) a carrier having a molded plastic seat bottom and a seat back;
  (b) a molded plastic base for releasably receiving the carrier;
  (c) a U-shaped carry handle attached to opposing lateral sides of the carrier and adapted for securing the carrier and base to each other, and lifting and carrying the carrier, and further including a one-hand carry handle release, comprising:
    (i) first and second carry handle Isofix latches carried by respective first and second opposing ends of the handle and adapted to latch complementary first and second Isofix latch bars carried by the base;
    (ii) first and second connector cables extending from each of the Isofix latches along an interior void in the handle to a handle grip positioned on the carry handle intermediate the first and second opposing ends of the handle;
    (iii) a release assembly, including an actuator button, mounted in the carry handle proximate the handle grip and cooperating with the connector cables for simultaneously releasing both first and second Isofix latches from the complementary first and second Isofix latch bars in the base upon operation of the actuator button of the release assembly to thereby detach the carrier from the base; and
  (d) an anti-rebound bar carried by the base and extending outwardly and upwardly from a foot end of the base for engaging a seat back of a vehicle seat to which the child safety seat is attached for retarding inertia-induced rotation of the base and the attached carrier by transmitting rotational force applied to the child safety seat during a sudden change in velocity into the seat back of the vehicle seat onto which the seat is attached.

2. A child safety seat according to claim 1, wherein the anti-rebound bar is attached to opposite sides of the base proximate a bottom surface thereof.

3. A child safety seat according to claim 1, wherein the anti-rebound bar is attached to opposite sides of the base proximate a bottom surface thereof and extends outwardly and upwardly to an apex that is in a plane above an uppermost extent of the base.

4. A child safety seat according to claim 1, wherein the anti-rebound bar is attached to opposite sides of the base proximate a bottom surface thereof and extends outwardly and upwardly to form a continuous side-to-side curved structure.

5. A child safety seat according to claim 1, wherein the anti-rebound bar is attached to opposite sides of the base proximate a bottom surface thereof and extends outwardly and upwardly to form a curve extending along a longitudinal axis of the base.

6. A child safety seat according to claim 1, wherein the anti-rebound bar is attached to opposite sides of the base proximate a bottom surface thereof and extends outwardly and upwardly to form a compound curve having a continuous side-to-side curve component and a front-to-rear curved component extending along a longitudinal axis of the base.

7. A child safety seat according to claim 1, wherein the anti-rebound bar is attached to opposite sides of the base forward of and attached to respective latching mechanisms whereby the carrier is attached to the base.

* * * * *